US012810780B2

(12) United States Patent
Lee et al.

(10) Patent No.: US 12,810,780 B2
(45) Date of Patent: Nov. 24, 2026

(54) ORGANIC LIGHT EMITTING DIODE (OLED) DISPLAY DEVICE PROVIDING RESTRICTED IMAGE VIEWING ANGLE

(71) Applicant: Samsung Display Co., LTD., Yongin-si (KR)

(72) Inventors: Sukhun Lee, Yongin-si (KR); Chaehee Park, Yongin-si (KR); Inbok Song, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/080,802

(22) Filed: Mar. 15, 2025

(65) Prior Publication Data

US 2026/0018108 A1 Jan. 15, 2026

(30) Foreign Application Priority Data

Jul. 15, 2024 (KR) ........................ 10-2024-0092946

(51) Int. Cl.
*G09G 3/32* (2016.01)

(52) U.S. Cl.
CPC ....... *G09G 3/32* (2013.01); *G09G 2320/0276* (2013.01); *G09G 2320/068* (2013.01); *G09G 2360/16* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291
USPC ...................................................... 345/76–83
See application file for complete search history.

(56) References Cited

U.S. PATENT DOCUMENTS

| | | | | |
|---|---|---|---|---|
| 10,885,855 B2 | 1/2021 | Park | | |
| 12,051,377 B2 | 7/2024 | Park et al. | | |
| 2008/0018570 A1* | 1/2008 | Gerets | ................. | G09G 3/3208 345/84 |
| 2009/0102352 A1* | 4/2009 | Cok | .................... | H10K 50/852 445/35 |

(Continued)

FOREIGN PATENT DOCUMENTS

| | | | |
|---|---|---|---|
| KR | 101436945 B1 | 9/2014 | |
| KR | 1020200015864 A | 2/2020 | |

(Continued)

*Primary Examiner* — Ke Xiao
*Assistant Examiner* — Nelson Lam
(74) *Attorney, Agent, or Firm* — CANTOR COLBURN LLP

(57) ABSTRACT

A display device driving method includes providing a display device including a first light-emitting element, a second light-emitting element, and an optical path control layer, generating a first graph by calculating first emission efficiency according to a luminance-specific time of the first light-emitting element, generating a second graph by calculating second emission efficiency according to a luminance-specific time of the second light-emitting element, calculating an emission ratio based on the first graph and the second graph, and calculating a first gamma value and a second gamma value, which are respectively applied to the first light-emitting element and the second light-emitting element, based on the emission ratio.

12 Claims, 15 Drawing Sheets

(56) References Cited

U.S. PATENT DOCUMENTS

| | | | | |
|---|---|---|---|---|
| 2011/0187687 | A1* | 8/2011 | Saitou | G09G 3/20<br>345/207 |
| 2011/0216097 | A1* | 9/2011 | Yoo | G09G 3/3233<br>345/76 |
| 2012/0154352 | A1* | 6/2012 | Yamashita | G09G 3/3233<br>345/207 |
| 2014/0368556 | A1* | 12/2014 | Funatsu | G09G 3/3241<br>345/76 |
| 2015/0091950 | A1* | 4/2015 | Park | G09G 3/3208<br>345/83 |
| 2015/0179108 | A1* | 6/2015 | Robinson | H05B 45/12<br>345/82 |
| 2015/0187258 | A1* | 7/2015 | Lee | G06V 40/19<br>345/207 |
| 2017/0092189 | A1* | 3/2017 | Hwang | G09G 3/3208 |
| 2020/0105218 | A1* | 4/2020 | Huang | G02F 1/13454 |
| 2023/0104678 | A1 | 4/2023 | Hong et al. | |
| 2023/0135235 | A1 | 5/2023 | Lee et al. | |
| 2023/0316978 | A1* | 10/2023 | Park | G09G 3/2007<br>345/690 |
| 2024/0015999 | A1* | 1/2024 | Shedletsky | H10K 59/13 |

FOREIGN PATENT DOCUMENTS

| | | | |
|---|---|---|---|
| KR | 1020220043832 | A | 4/2022 |
| KR | 1020230049187 | A | 4/2023 |
| KR | 1020230064067 | A | 5/2023 |
| KR | 1020240042330 | A | 4/2024 |

* cited by examiner

ORGANIC LIGHT EMITTING DIODE (OLED) DISPLAY DEVICE PROVIDING RESTRICTED IMAGE VIEWING ANGLE

This application claims priority to Korean Patent Application No. 10-2024-0092946 filed on Jul. 15, 2024, and all the benefits accruing therefrom under 35 U.S.C. § 119, the content of which in its entirety is herein incorporated by reference.

BACKGROUND

1. Field

Embodiments of the disclosure described herein relate to a display device with improved display quality and a method for driving the display device.

2. Description of the Related Art

Display devices used in various devices, such as televisions, mobile phones, tablet personal computers ("PCs"), and vehicles, are being developed. Depending on the usage environment where information needs to be protected or on safety regulations, the viewing angle of a display device may be desired to be restricted. Accordingly, research is being conducted to restrict the viewing angle.

SUMMARY

Embodiments of the disclosure provide a display device with improved display quality, and a method for driving the display device.

Embodiments of the disclosure provide a display device operating in various modes, and a method for driving the display device.

Embodiments of the disclosure provide a display device providing images of different viewing angles, and a method for driving the display device.

In an embodiment of the disclosure, a display device driving method includes providing a display device including a first light-emitting element, a second light-emitting element, and an optical path control layer, which is disposed to overlap the second light-emitting element and controls a path of light provided from the second light-emitting element, generating a first graph by calculating first emission efficiency according to a luminance-specific time of the first light-emitting element, generating a second graph by calculating second emission efficiency according to a luminance-specific time of the second light-emitting element, calculating an emission ratio based on the first graph and the second graph, and calculating a first gamma value and a second gamma value, which are respectively applied to the first light-emitting element and the second light-emitting element, based on the emission ratio.

In an embodiment, the calculating the emission ratio may include extracting a plurality of graphs in which a deterioration amount of the first light-emitting element is similar to a deterioration amount of the second light-emitting element, and selecting the first graph and the second graph, which have highest emission efficiency, from among the plurality of graphs.

In an embodiment, the plurality of graphs may be graphs in which the first graph is next (adjacent) to the second graph at a predetermined time.

In an embodiment, the selecting the first graph and the second graph may include selecting a group with a greatest sum of pieces of luminance of the first graph and the second graph from the plurality of graphs.

In an embodiment, the emission ratio may be a luminance ratio between the first graph and the second graph that are selected from the plurality of graphs.

In an embodiment, the first gamma value may be different from the second gamma value.

In an embodiment, the display device driving method may further include driving the display device in a first mode or a second mode different from the first mode. The first light-emitting element and the second light-emitting element may emit light in the first mode. Only the second light-emitting element may emit light in the second mode.

In an embodiment, in the first mode, first luminance of the first light-emitting element may be different from second luminance of the second light-emitting element.

In an embodiment, third luminance of the second light-emitting element in the second mode may be different from the second luminance of the second light-emitting element in the first mode.

In an embodiment, the display device driving method may further include providing a mode ratio selected by a user. The calculating the first gamma value and the second gamma value may further include calculating a first correction ratio by multiplying the emission ratio by the mode ratio, and calculating the first gamma value and the second gamma value based on the first correction ratio.

In an embodiment, the calculating the first gamma value and the second gamma value may further include calculating a second correction ratio by further multiplying a value corresponding to the second light-emitting element in the emission ratio by a decrease constant, and calculating the first gamma value and the second gamma value based on the second correction ratio.

In an embodiment, the decrease constant may have a value between 0 and 1.

In an embodiment, the display device may further include a memory. The first graph and the second graph may be stored in the memory.

In an embodiment, in a plan view, an area size of an emission area of the first light-emitting element may be larger than an area size of an emission area of the second light-emitting element.

In an embodiment of the disclosure, a display device includes a display layer, an optical path control layer disposed on the display layer and controlling a path of light provided from the display layer, and a driving controller that drives the display layer. The display layer includes a pixel driving circuit, a first light-emitting element electrically connected to the pixel driving circuit, and a second light-emitting element electrically connected to the pixel driving circuit. The optical path control layer may be disposed to overlap the second light-emitting element and may control a path of light provided from the second light-emitting element. The driving controller calculates an emission ratio based on a first graph, which is obtained by calculating first emission efficiency according to a luminance-specific time of the first light-emitting element, and a second graph obtained by calculating second emission efficiency according to a luminance-specific time of the second light-emitting element, and calculates a first gamma value and a second gamma value, which are respectively applied to the first light-emitting element and the second light-emitting element, based on the emission ratio.

In an embodiment, the display device may further include a memory. The first graph and the second graph may be stored in the memory.

In an embodiment, in a plan view, an area size of an emission area of the first light-emitting element may be larger than an area size of an emission area of the second light-emitting element.

In an embodiment, the first gamma value may be different from the second gamma value.

In an embodiment, the display layer may operate in a first mode or in a second mode different from the first mode. The first light-emitting element and the second light-emitting element may emit light in the first mode. Only the second light-emitting element may emit light in the second mode.

In an embodiment, in the first mode, first luminance of the first light-emitting element may be different from second luminance of the second light-emitting element. Third luminance of the second light-emitting element in the second mode may be different from the second luminance of the second light-emitting element in the first mode.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1A:
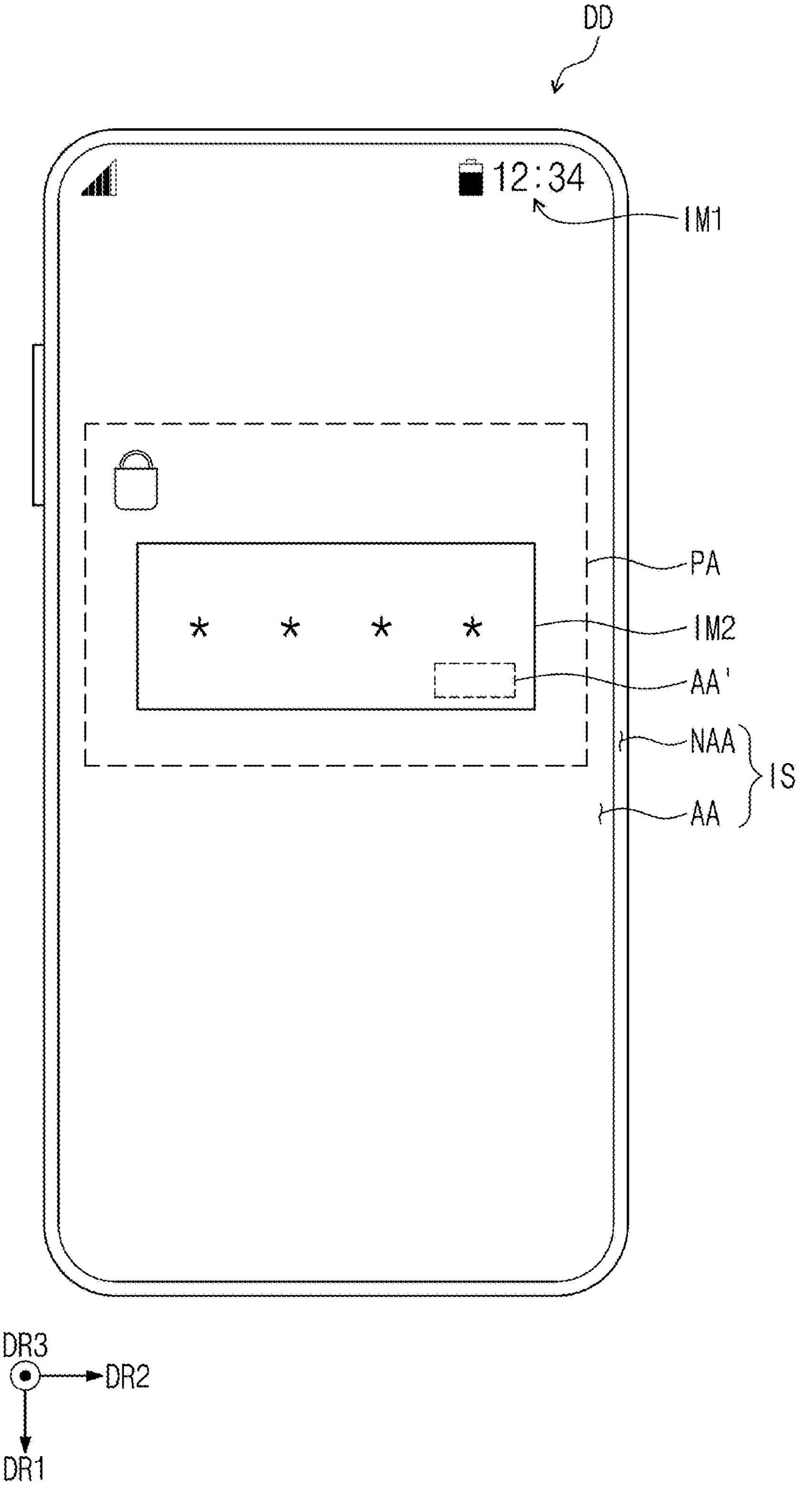
FIG. 1A is a front view of an embodiment of a display device, according to the disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

A term such as "unit" may mean a software component or a hardware component that performs a predetermined function unless the term is particularly defined. For example, the hardware component may include a field-programmable gate array ("FPGA") or an application-specific integrated circuit ("ASIC"). The software component may refer to executable codes and/or data used by the executable codes in an addressable storage medium. Accordingly, the software components may be, for example, object-oriented software components, class components, and task components, and may include processes, functions, attributes, procedures, subroutines, program code segments, drivers, firmware, microcodes, circuits, data, databases, data structures, tables, arrays, or variables, for example.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

Figure 1B:
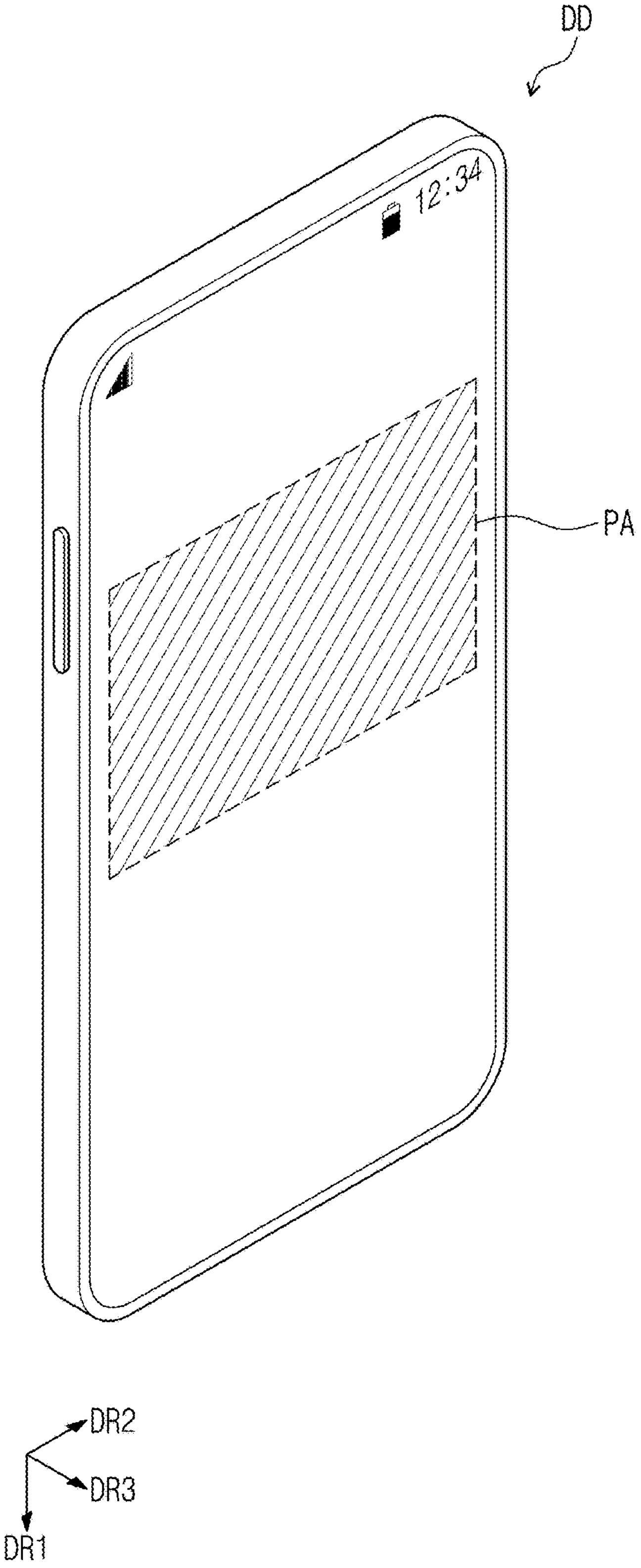
FIG. 1B is a perspective view of an embodiment of a display device, according to the disclosure.

FIG. 1A is a front view of an embodiment of a display device, according to the disclosure. FIG. 1B is a perspective view of an embodiment of a display device, according to the disclosure.

Referring to FIGS. 1A and 1B, a display device DD may be a device activated in response to an electrical signal. The display device DD may be applied to an electronic device such as a mobile phone, a tablet personal computer ("PC"), a smart watch, a laptop, a computer, and a smart television.

The display device DD may display images IM1 and IM2 on a display surface IS parallel to a first direction DR1 and a second direction DR2 intersecting with the first direction DR1. The display surface IS may correspond to a front surface of the display device DD. The images IM1 and IM2 may include still images as well as moving images. The normal direction of the display surface IS (i.e., the thickness direction of the display device DD) may be indicated by a third direction DR3. A front surface (or an upper surface) and a rear surface (or a lower surface) of each layer or unit described later may be divided by the third direction DR3.

The display surface IS of the display device DD may be divided into an active area AA and a peripheral area NAA. The active area AA may be an area where the images IM1 and IM2 are displayed. A user may perceive the images IM1 and IM2 through the active area AA. In an embodiment, the active area AA is illustrated in a shape of a quadrangle whose corners are rounded. However, this is illustrated as an example. The active area AA may have various shapes, not limited to an embodiment.

The peripheral area NAA may be next (adjacent) to the active area AA. The peripheral area NAA may have a given color. The peripheral area NAA may surround the active area AA. Accordingly, the shape of the active area AA may be practically defined by the peripheral area NAA. However, this is illustrated as an example. The peripheral area NAA may be next (adjacent) to only one side of the active area AA or may be omitted. The display device DD in an embodiment of the disclosure may include various embodiments and is not limited to an embodiment.

The display device DD may operate in a first mode and a second mode. The first mode may be a normal mode for displaying a screen at a first viewing angle. The second mode may be a viewing angle control mode for displaying the screen at a second viewing angle narrower than the first viewing angle. The second mode may be also referred to as a "privacy mode", a "privacy protection mode", or the like. The first viewing angle and the second viewing angle may be defined as angles at which an image is capable of being viewed without the distortion of image quality based on the normal direction of the display surface IS.

The images IM1 and IM2 may include the first image IM1 and the second image IM2. The first image IM1 may be an image displayed in one area operating in the first mode. The second image IM2 may be an image displayed in a privacy protection area PA operating in the second mode.

FIGS. 1A and 1B illustrate that the first image IM1 is an image showing a status, such as state of charge ("SOC") and current time, and the second image IM2 is an image requiring privacy protection, such as a field for entering a password. However, this is an illustrative embodiment and the configuration of the first image IM1 and the second image IM2 in the disclosure is not limited thereto.

When the display device DD is viewed from a front surface (alternatively, a direction parallel to the normal direction, or the third direction DR3) in the first mode or the second mode, the first image IM1 and the second image IM2 generated by the display device DD may be perceived by the user.

When the display device DD is viewed at an angle exceeding the second viewing angle in the second mode, the second image IM2 may not be perceived. For reference, when the display device DD is viewed at an angle exceeding the second viewing angle in the first mode, the user may perceive the first image IM1.

The second viewing angle of the second mode and the luminance at the second viewing angle may be set in various ways. In an embodiment, the second viewing angle is 45 degrees, and the luminance at 45 degrees may be 10 percent of the maximum luminance, for example, but is not particularly limited thereto.

The display device DD may selectively operate in one of the first mode for displaying the screen at the first viewing angle, or the second mode for displaying the screen at the second viewing angle narrower than the first viewing angle. The switch between the first mode and the second mode may be set by the user, or the switch may be made from the first mode to the second mode when a predetermined application is running. In an embodiment, when an application (e.g., a bank application or a note application) that poses a risk of personal information exposure is running, the mode of the display device DD may be switched from the first mode to the second mode, for example.

Figure 2:
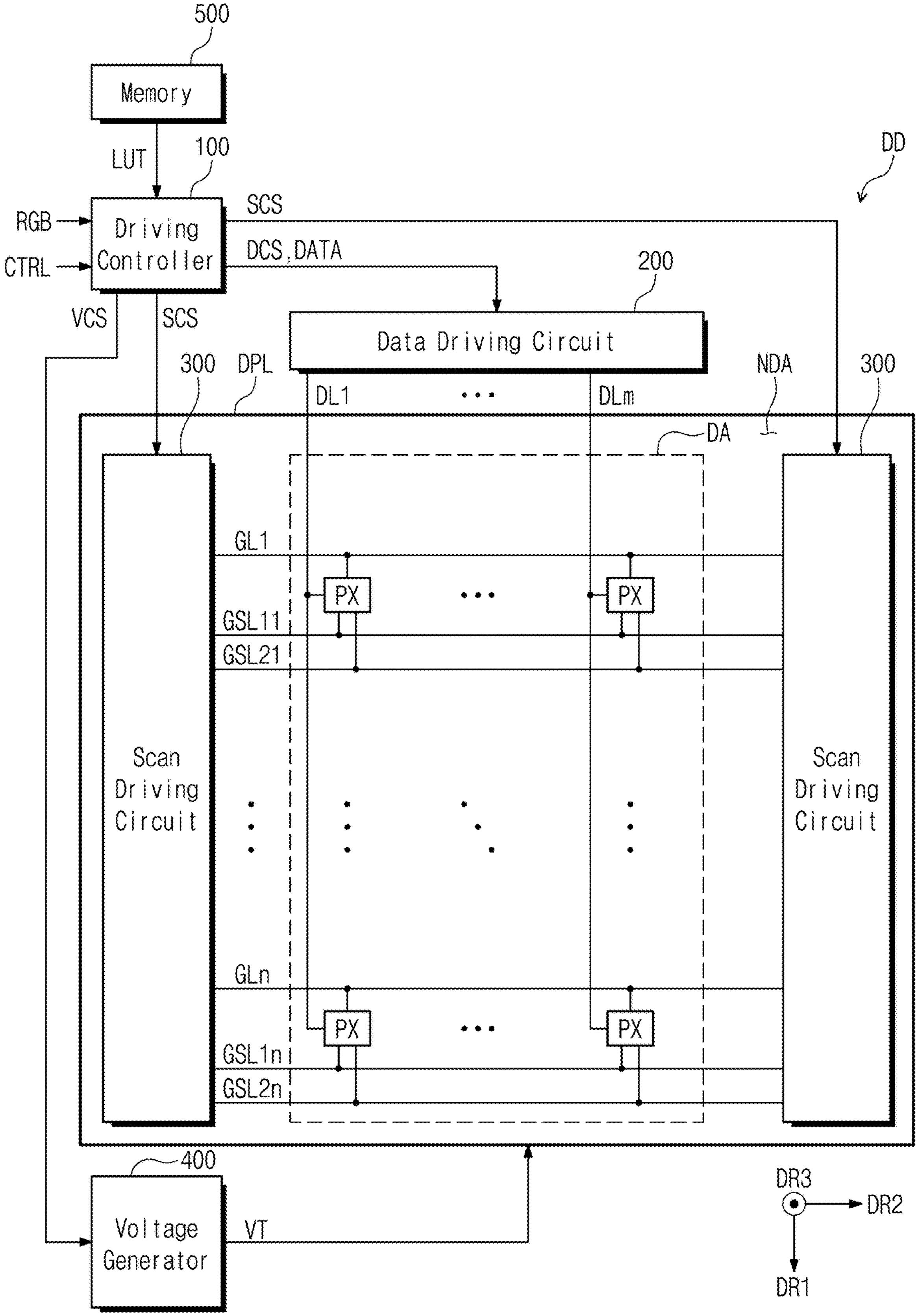
FIG. 2 is a block diagram of an embodiment of a display device, according to the disclosure.

FIG. 2 is a block diagram of an embodiment of a display device, according to the disclosure.

Referring to FIG. 2, the display device DD may include a display layer DPL, a driving controller 100 for driving the display layer DPL, a panel driver, and a memory 500. In an embodiment of the disclosure, the panel driver may include a data driving circuit 200 (or a data driver), scan driving circuits 300, and a voltage generator 400.

A display area DA and a non-display area NDA may be defined in the display layer DPL. The display layer DPL may include a plurality of pixels PX disposed in the display area DA. The scan driving circuits 300 may be included in the display layer DPL.

The display layer DPL may include a plurality of scan lines GL1 to GLn (where n is a natural number greater than 1), a plurality of first selection lines GSL11 to GSL1*n*, and a plurality of second selection lines GSL21 to GSL2*n*.

The driving controller 100 may receive an image signal RGB and a control signal CTRL. The driving controller 100 may generate a data signal DATA by converting a data format of the image signal RGB so as to be suitable for the interface specification of the data driving circuit 200. The driving controller 100 may output a first control signal SCS, a second control signal DCS, and a third control signal VCS.

The data driving circuit 200 may receive the second control signal DCS and the data signal DATA from the driving controller 100. The data driving circuit 200 may convert the data signal DATA into data voltages and may output the data voltages to a plurality of data lines DL1 to DLm (where m is a natural number greater than 1). The data voltages may be analog voltages corresponding to grayscale values of the data signal DATA. The plurality of data lines DL1 to DLm may be arranged in the second direction DR2. Each of the plurality of data lines DL1 to DLm may extend in the first direction DR1.

The plurality of scan driving circuits 300 may be disposed in the non-display area NDA of the display layer DPL, but is not particularly limited thereto. In an embodiment, at least part of each of the scan driving circuits 300 may be disposed in the display area DA, for example. The scan driving circuits 300 may be formed through the same process as the pixel circuit of the plurality of pixels PX.

Each of the plurality of scan driving circuits 300 may receive the first control signal SCS. The plurality of scan driving circuits 300 may output scan signals to the plurality of scan lines GL1 to GLn. The plurality of scan driving circuits 300 may output selection signals to the plurality of first selection lines GSL11 to GSL1*n* and the plurality of second selection lines GSL21 to GSL2*n*.

The display device DD may operate in a first mode or a second mode based on the selection signal received through the plurality of first selection lines GSL11 to GSL1*n* and the plurality of second selection lines GSL21 to GSL2*n*.

FIG. 2 illustrates the scan driving circuits 300 spaced apart from each other with the display area DA therebetween, but one of the scan driving circuits 300 in an embodiment of the disclosure may be omitted.

The plurality of scan lines GL1 to GLn, the plurality of first selection lines GSL11 to GSL1*n*, and the plurality of second selection lines GSL21 to GSL2*n* may extend in the second direction DR2. The plurality of scan lines GL1 to GLn, the plurality of first selection lines GSL11 to GSL1*n*, and the plurality of second selection lines GSL21 to GSL2*n* may be spaced from each other in the first direction DR1.

The voltage generator 400 may generate voltages VT desired for an operation of the display device DD. The voltage generator 400 may provide the voltages VT to the display layer DPL.

The memory 500 may provide a lookup table LUT to the driving controller 100. The lookup table LUT may include graphs derived by calculating the emission efficiency according to a luminance-specific time of the light-emitting element of each of the plurality of pixels PX. This will be described later.

Figure 3A:
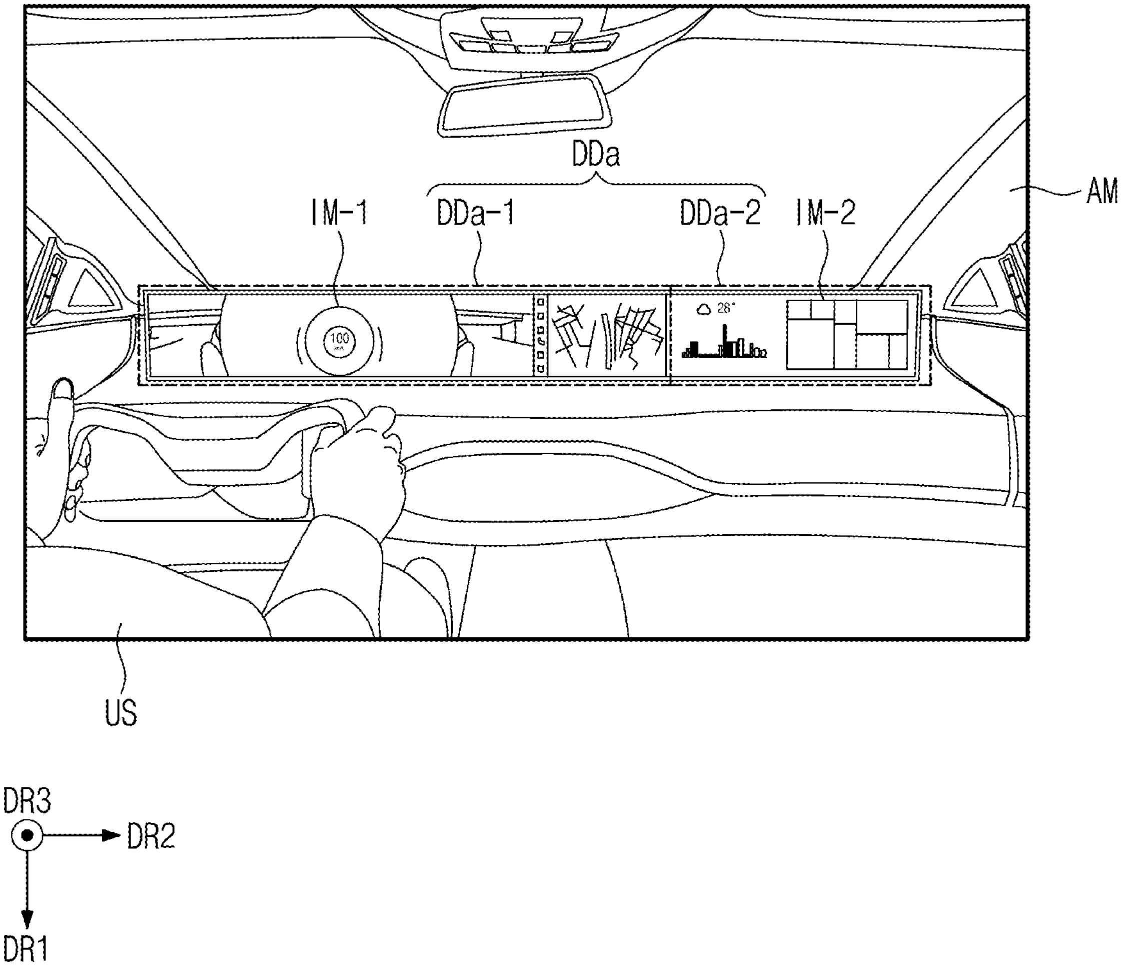
FIG. 3A is a drawing illustrating an embodiment of an interior of a vehicle, in which a display device is disposed, according to the disclosure.
Figure 3B:
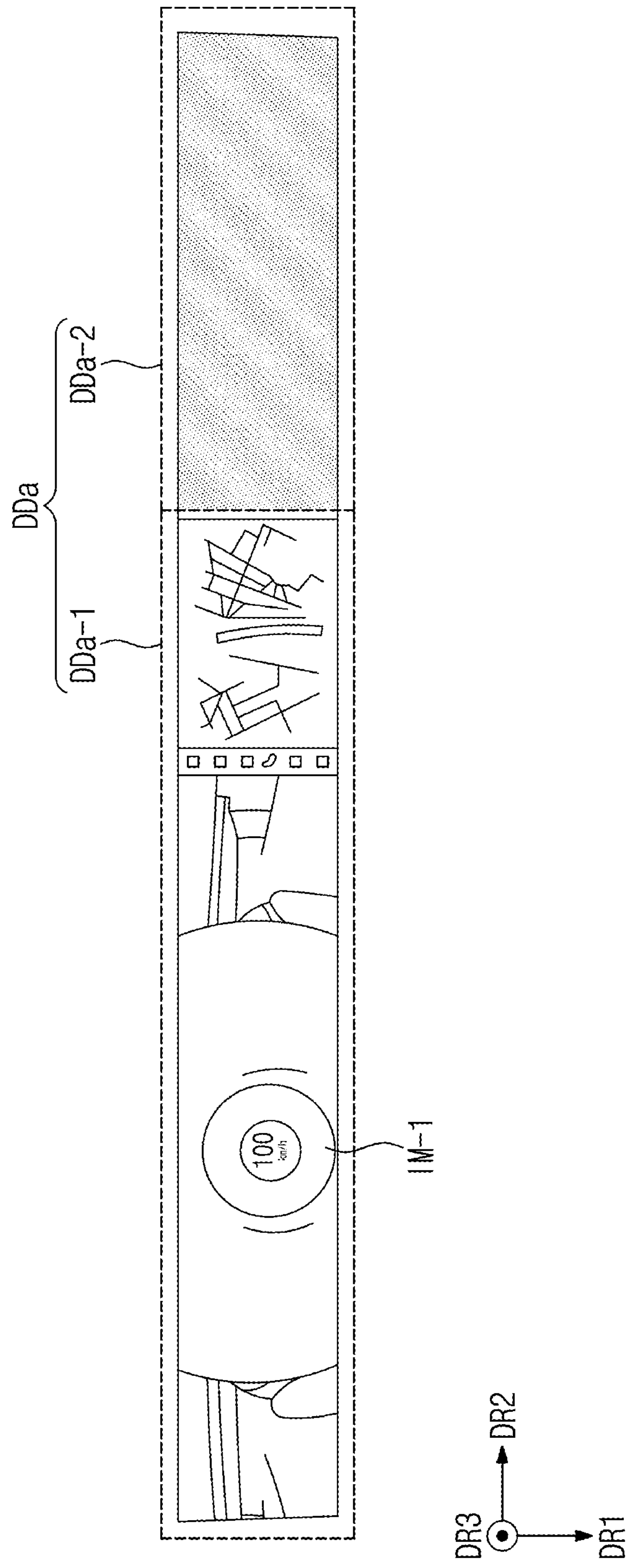
FIG. 3B illustrates an embodiment of an image viewed at a driver's seat when a display device operates in a second mode, according to the disclosure.

FIG. 3A is a drawing illustrating an embodiment of an interior of a vehicle, in which a display device is disposed, according to the disclosure. FIG. 3B illustrates an embodiment of an image viewed at a driver's seat when a display device operates in a second mode, according to the disclosure.

Referring to FIGS. 3A and 3B, a display device DDa may be disposed inside a vehicle AM. The display device DDa may be disposed inside the vehicle AM to provide various pieces of information to a driver US.

The display device DDa may include a first display device DDa-1 and a second display device DDa-2. The first display device DDa-1 may provide the driver US with a first image IM-1 desired for driving. The second display device DDa-2 may be disposed at a position facing a passenger seat to provide a second image IM-2. In an embodiment, the first image IM-1 may include speed information, vehicle status information, vehicle internal manipulation information, and navigation information, and the second image IM-2 may display not only information desired for driving, but also various pieces of information unrelated to driving, for example.

In an embodiment of the disclosure, the first display device DDa-1 and the second display device DDa-2 may be separate display devices from each other or may be one display device including one panel. When the first display device DDa-1 and the second display device DDa-2 are separate display devices, the first display device DDa-1 may not include an operation of controlling a viewing angle, and the second display device DDa-2 may operate in the first mode or the second mode. When the first display device DDa-1 and the second display device DDa-2 are one display device DDa, both the first display device DDa-1 and the second display device DDa-2 may operate in the first mode or the second mode. In an alternative embodiment, only the second display device DDa-2 may partially operate in the first mode or the second mode.

The first mode may be a normal mode for displaying a screen at a first viewing angle. The second mode may be a viewing angle control mode for displaying the screen at a second viewing angle narrower than the first viewing angle. The second viewing angle of the second mode and the luminance at the second viewing angle may be set in various ways. In an embodiment, the second viewing angle and the luminance at the second viewing angle may be set depending on regulations of the country in which the vehicle AM is driven, for example. In an embodiment, the second viewing angle is 35 degrees, and the luminance at 35 degrees may be 0.75 percent of the maximum luminance, for example, but is not particularly limited thereto.

The driver US who is driving may only view the first image IM-1 desired for driving, and may not view the second image IM-2, in which information unnecessary for driving is also displayed, due to the restriction of a viewing angle.

The switch between the first mode and the second mode may be changed depending on whether the vehicle AM is driving or stopped. In an embodiment, when the vehicle AM is driving, the at least second display device DDa-2 may operate in the second mode. When the vehicle AM is stopped, the second display device DDa-2 may operate in the first mode, for example. In an alternative embodiment, when the vehicle AM operates in an autonomous driving mode even though the vehicle AM is driving, the second display device DDa-2 may operate in the first mode. When the second display device DDa-2 operates in the first mode, the driver US may view the second image IM-2 shown in FIG. 3A.

Figure 4:
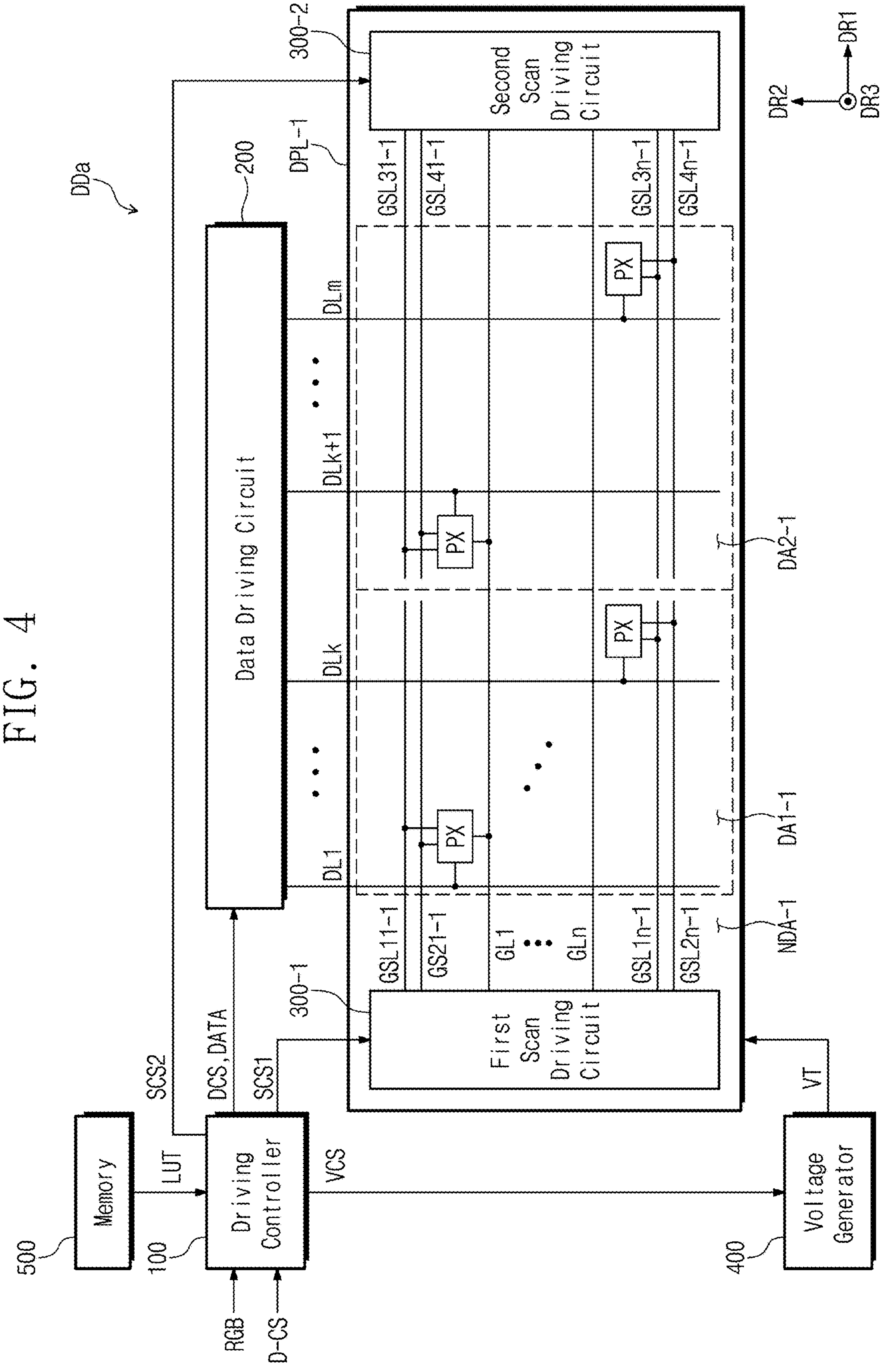
FIG. 4 is a block diagram of an embodiment of a display device, according to the disclosure.

FIG. 4 is a block diagram of an embodiment of a display device, according to the disclosure. In the description of FIG. 4, the same reference numerals are assigned to the same components described with reference to FIG. 2, and thus the descriptions thereof are omitted.

Referring to FIGS. 3A to 4, a first display area DA1-1, a second display area DA2-1, and a non-display area NDA-1 may be defined in a display layer DPL-1. The first display area DA1-1 may correspond to the active area of the first display device DDa-1, and the second display area DA2-1 may correspond to the active area of the second display device DDa-2.

The display layer DPL-1 may include the plurality of pixels PX, a first scan driving circuit 300-1, a second scan driving circuit 300-2, the plurality of scan lines GL1 to GLn, a plurality of first selection lines GSL11-1 to GSL1*n*-1, a plurality of second selection lines GSL21-1 to GSL2*n*-1, a plurality of third selection lines GSL31-1 to GSL3*n*-1, and a plurality of fourth selection lines GSL41-1 to GSL4*n*-1.

The plurality of pixels PX disposed in the first display area DA1-1 may be connected to the plurality of first selection lines GSL11-1 to GSL1*n*-1 and the plurality of second selection lines GSL21-1 to GSL2*n*-1.

In a plan view, the plurality of first selection lines GSL11-1 to GSL1*n*-1 and the plurality of second selection lines GSL21-1 to GSL2*n*-1 may not overlap the second display area DA2-1.

The plurality of pixels PX disposed in the first display area DA1-1 may be connected to the first to k-th data lines DL1 to DLk (here k is a natural number less than m).

The first scan driving circuit 300-1 may receive a first control signal SCS1 from the driving controller 100. The first scan driving circuit 300-1 may be connected to the plurality of scan lines GL1 to GLn, the plurality of first selection lines GSL11-1 to GSL1*n*-1, and the plurality of second selection lines GSL21-1 to GSL2*n*-1.

The first display device DDa-1 may operate in a first mode or a second mode based on a selection signal received through the plurality of first selection lines GSL11-1 to GSL1n-1 and the plurality of second selection lines GSL21-1 to GSL2n-1.

The plurality of pixels PX disposed in the second display area DA2-1 may be connected to the plurality of third selection lines GSL31-1 to GSL3n-1 and the plurality of fourth selection lines GSL41-1 to GSL4n-1.

In a plan view, the plurality of third selection lines GSL31-1 to GSL3n-1 and the plurality of fourth selection lines GSL41-1 to GSL4n-1 may not overlap the first display area DA1-1.

The plurality of pixels PX disposed in the second display area DA2-1 may be connected to the (k+1)-th to m-th data lines DLk+1 to DLm.

The second scan driving circuit 300-2 may receive a second control signal SCS2 from the driving controller 100. The second scan driving circuit 300-2 may be connected to the plurality of scan lines GL1 to GLn, the plurality of third selection lines GSL31-1 to GSL3n-1, and the plurality of fourth selection lines GSL41-1 to GSL4n-1.

That is, the plurality of scan lines GL1 to GLn may be connected to the first scan driving circuit 300-1 and the second scan driving circuit 300-2. The plurality of first selection lines GSL11-1 to GSL1n-1 and the plurality of second selection lines GSL21-1 to GSL2n-1 may be connected to the first scan driving circuit 300-1 and may not be connected to the second scan driving circuit 300-2. The plurality of third selection lines GSL31-1 to GSL3n-1 and the plurality of fourth selection lines GSL41-1 to GSL4n-1 may be connected to the second scan driving circuit 300-2 and may not be connected to the first scan driving circuit 300-1.

The second display device DDa-2 may operate in a first mode or a second mode based on a selection signal received through the plurality of third selection lines GSL31-1 to GSL3n-1 and the plurality of fourth selection lines GSL41-1 to GSL4n-1.

Figure 5A:
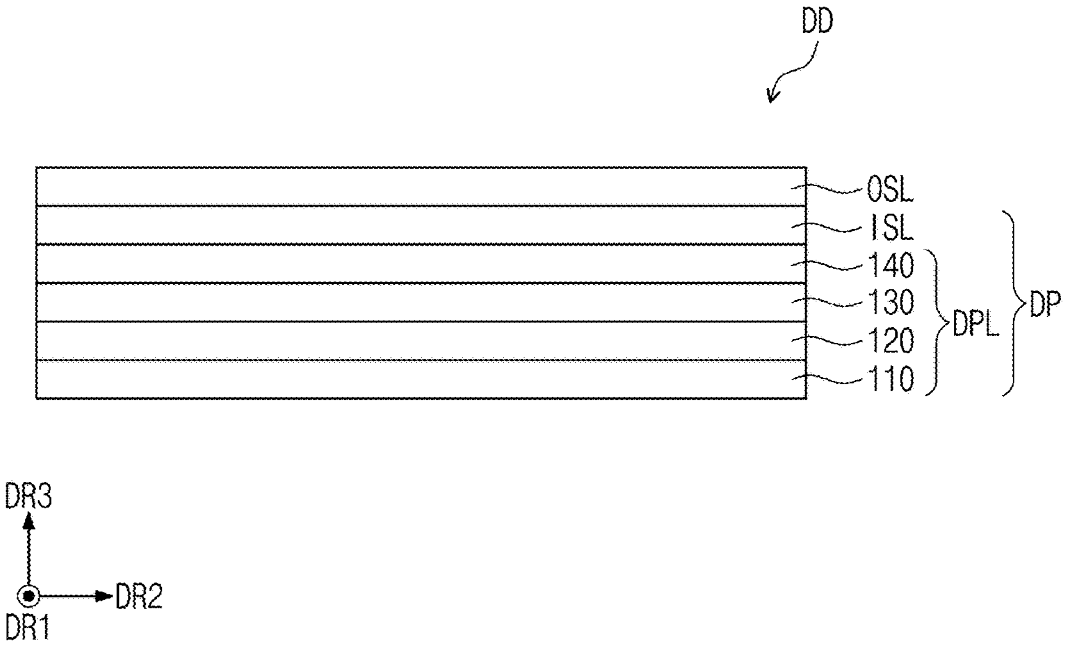
FIG. 5A is a cross-sectional view of an embodiment of a display device, according to the disclosure.

FIG. 5A is a cross-sectional view of an embodiment of a display device, according to the disclosure.

Referring to FIG. 5A, the display device DD may include a display panel DP and an optical path control layer OSL. A protective film, window, or functional coating layer that provides the front surface of the display device DD may be further disposed on the optical path control layer OSL.

The display panel DP may include the display layer DPL and a sensor layer ISL.

The display layer DPL may include a base layer 110, a circuit layer 120, a light-emitting element layer 130, and an encapsulation layer 140. The display layer DPL may be a component that actually generates images. The display layer DPL may be a light-emitting display layer. In an embodiment, the display layer DPL may be an organic light-emitting display layer, an inorganic light-emitting display layer, an organic-inorganic light-emitting display layer, a quantum dot display layer, a micro-light-emitting diode ("LED") display layer, or a nano-LED display layer, for example.

The sensor layer ISL may sense an external input applied from the outside. The external input may be a user input. The user input may include various types of external inputs such as a part of a user body, light, heat, a pen, or pressure. The sensor layer ISL may be also referred to as a "sensor", an "input sensing layer", or an "input sensing panel". The sensor layer ISL may be formed through a continuous process with the display layer DPL and may be disposed directly on the display layer DPL. However, an embodiment is not particularly limited thereto. In an embodiment, the sensor layer ISL may be bonded to the display layer DPL via an adhesive layer, for example.

The optical path control layer OSL may control the light path provided by the display layer DPL. The optical path control layer OSL may include a structure for controlling the path of light. The optical path control layer OSL may be disposed on the sensor layer ISL. The optical path control layer OSL may be formed through a continuous process with the display layer DPL and the sensor layer ISL, and may be disposed directly on the sensor layer ISL. However, an embodiment is not particularly limited thereto. In an embodiment, the optical path control layer OSL may be bonded to the sensor layer ISL through an adhesive layer, for example.

Figure 5B:
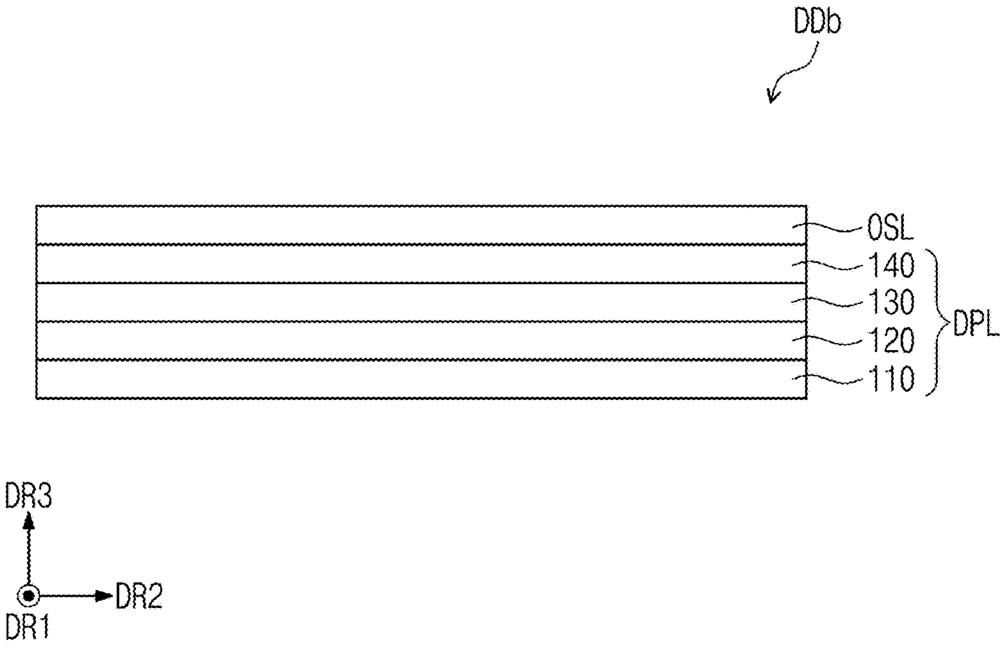
FIG. 5B is a cross-sectional view of an embodiment of a display device, according to the disclosure.

FIG. 5B is a cross-sectional view of an embodiment of a display device, according to the disclosure.

Referring to FIG. 5B, a display device DDb may include the display layer DPL and the optical path control layer OSL. Compared to the illustration in FIG. 5A, the display device DDb may not include the sensor layer ISL (refer to FIG. 5A). The optical path control layer OSL may be formed through a continuous process with the display layer DPL and may be disposed directly on the display layer DPL. However, an embodiment is not particularly limited thereto.

Figure 6:
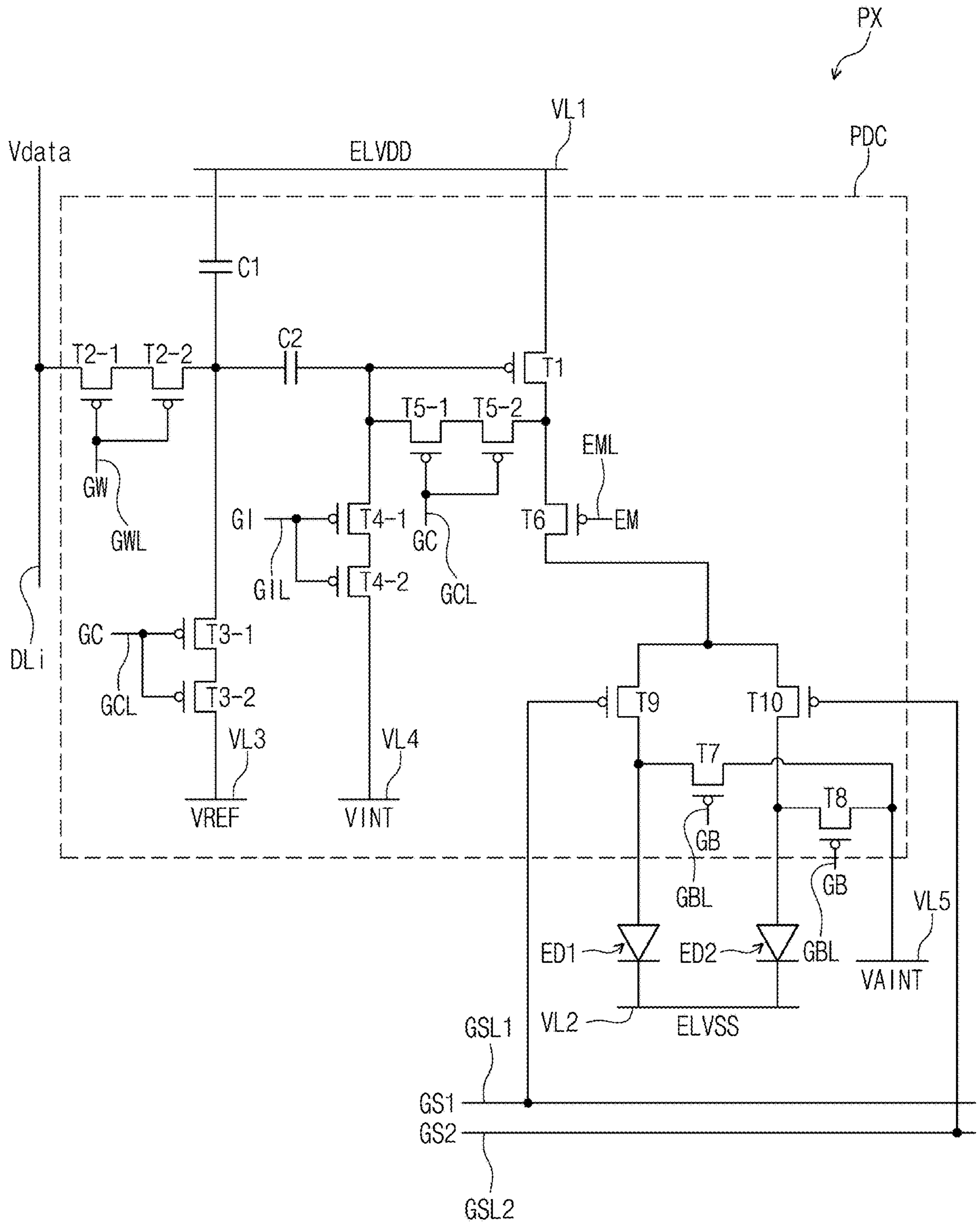
FIG. 6 is an equivalent circuit diagram of an embodiment of a pixel, according to the disclosure.

FIG. 6 is an equivalent circuit diagram of an embodiment of a pixel, according to the disclosure.

Referring to FIGS. 2 and 6, the plurality of scan lines GL1 to GLn may include an initialization gate line GIL, a black gate line GBL, a write gate line GWL, a compensation gate line GCL, and an emission control line EML.

The pixel PX may be connected to the initialization gate line GIL, the black gate line GBL, the write gate line GWL, the compensation gate line GCL, the emission control line EML, and an i-th data line DLi (here i is a natural number equal to or less than m).

The pixel PX in an embodiment of the disclosure may include a pixel circuit PDC, a first light-emitting element ED1, and a second light-emitting element ED2. The pixel circuit PDC may include one or more transistors and one or more capacitors. The pixel circuit PDC may include first to tenth transistors T1, T2-1, T2-2, T3-1, T3-2, T4-1, T4-2, T5-1, T5-2, T6, T7, T8, T9, and T10 and capacitors C1 and C2.

Each of the first to tenth transistors T1, T2-1, T2-2, T3-1, T3-2, T4-1, T4-2, T5-1, T5-2, T6, T7, T8, T9, and T10 may be a P-type thin film transistor having a silicon semiconductor layer, e.g., a low-temperature polycrystalline silicon ("LTPS") semiconductor layer. However, the disclosure is not limited thereto. Some of the first to tenth transistors T1, T2-1, T2-2, T3-1, T3-2, T4-1, T4-2, T5-1, T5-2, T6, T7, T8, T9, and T10 are N-type thin film transistors with an oxide semiconductor as a semiconductor layer, and the rest may be P-type thin film transistors. In an embodiment, all of the first to tenth transistors T1, T2-1, T2-2, T3-1, T3-2, T4-1, T4-2, T5-1, T5-2, T6, T7, T8, T9, and T10 may be N-type thin film transistors.

The initialization gate line GIL may deliver an initialization gate signal GI, the black gate line GBL may deliver a black gate signal GB, the write gate line GWL may deliver a write gate signal GW, the compensation gate line GCL may deliver a compensation gate signal GC, the emission control line EML may deliver an emission control signal EM, and the i-th data line DLi may deliver a data voltage Vdata. The data voltage Vdata may have a voltage level corresponding to the grayscale value of the data signal DATA output from the driving controller 100.

Besides, the pixel PX may be connected to first to fifth voltage lines VL1, VL2, VL3, VL4, and VL5. The first to fifth voltage lines VL1, VL2, VL3, VLA, and VL5 may be connected to the voltage generator 400.

The first voltage line VL1 may deliver a first driving voltage ELVDD, the second voltage line VL2 may deliver a second driving voltage ELVSS, the third voltage line VL3 may deliver a reference voltage VREF, the fourth voltage line VL4 may deliver a first initialization voltage VINT, and the fifth voltage line VL5 may deliver a second initialization voltage VAINT.

The voltages VT of the voltage generator 400 may include the first driving voltage ELVDD, the second driving voltage ELVSS, the reference voltage VREF, the first initialization voltage VINT, and the second initialization voltage VAINT.

The first transistor T1 may include a first electrode electrically connected to the first voltage line VL1, a second electrode, which is electrically connected to the anode of the first light-emitting element ED1 via the sixth transistor T6 and the ninth transistor T9 or which is electrically connected to the anode of the second light-emitting element ED2 via the sixth transistor T6 and the tenth transistor T10, and a gate electrode connected to the second capacitor C2. The first transistor T1 may be also referred to as a "driving transistor".

The second transistor (T2-1, T2-2) may include a first electrode connected to the gate electrode of the first transistor T1 via the second capacitor C2, a second electrode connected to the i-th data line DLi, and a gate electrode connected to the write gate line GWL. The second transistor (T2-1, T2-2) may be turned on in response to the write gate signal GW to deliver the data voltage Vdata delivered from the i-th data line DLi to the second capacitor C2. The second transistor (T2-1, T2-2) may be also referred to as a "switching transistor".

The second transistor (T2-1, T2-2) may include the 2-1st transistor T2-1 and the 2-2nd transistor T2-2 that are connected to each other in series. The 2-1st transistor T2-1 and the 2-2nd transistor T2-2 may be provided as dual transistors.

The first capacitor C1 may be connected between the first electrode of the second transistor (T2-1, T2-2) and the first voltage line VL1.

The second capacitor C2 may be connected between the first electrode of the second transistor (T2-1, T2-2) and the gate electrode of the first transistor T1.

The third transistor (T3-1, T3-2) may include a first electrode connected to the first electrode of the second transistor (T2-1, T2-2), a second electrode connected to the third voltage line VL3, and a gate electrode connected to the compensation gate line GCL. The third transistor (T3-1, T3-2) may be turned on in response to the compensation gate signal GC to provide the reference voltage VREF to one end of each of the first capacitor C1 and the second capacitor C2.

The third transistor (T3-1, T3-2) may include the 3-1st transistor T3-1 and the 3-2nd transistor T3-2 that are connected to each other in series. The 3-1st transistor T3-1 and the 3-2nd transistor T3-2 may be provided as dual transistors.

The fourth transistor (T4-1, T4-2) may include a first electrode connected to the gate electrode of the first transistor T1, a second electrode connected to the fourth voltage line VL4, and a gate electrode connected to the initialization gate line GIL. The fourth transistor (T4-1, T4-2) may be turned on in response to the initialization gate signal GI to provide the first initialization voltage VINT to the gate electrode of the first transistor T1. The gate electrode of the first transistor T1 may be initialized to the first initialization voltage VINT by the operation of the fourth transistor (T4-1, T4-2).

The fourth transistor (T4-1, T4-2) may include the 4-1st transistor T4-1 and the 4-2nd transistor T4-2 that are connected to each other in series. The 4-1st transistor T4-1 and the 4-2nd transistor T4-2 may be provided as dual transistors.

The fifth transistor (T5-1, T5-2) may include a first electrode connected to the second electrode of the first transistor T1, a second electrode connected to the gate electrode of the first transistor T1, and a gate electrode connected to the compensation gate line GCL. The fifth transistor (T5-1, T5-2) may be turned on in response to the compensation gate signal GC such that the second electrode and the gate electrode of the first transistor T1 are connected to each other.

The fifth transistor (T5-1, T5-2) may include the 5-1st transistor T5-1 and the 5-2nd transistor T5-2 that are connected to each other in series. The 5-1st transistor T5-1 and the 5-2nd transistor T5-2 may be provided as dual transistors.

The sixth transistor T6 may include a first electrode connected to the second electrode of the first transistor T1, a second electrode, which is connected to the anode of the first light-emitting element ED1 via the ninth transistor T9 or which is connected to the anode of the second light-emitting element ED2 via the tenth transistor T10, and a gate electrode connected to the emission control line EML. The sixth transistor T6 may be turned on in response to the emission control signal EM to electrically connect the first transistor T1 to the first light-emitting element ED1 or the second light-emitting element ED2.

The seventh transistor T7 may include a first electrode connected to the anode of the first light-emitting element ED1, a second electrode connected to the fifth voltage line VL5, and a gate electrode connected to the black gate line GBL. The seventh transistor T7 may be turned on in response to the black gate signal GB to provide the second initialization voltage VAINT to the anode of the first light-emitting element ED1. The seventh transistor T7 may initialize the anode of the first light-emitting element ED1 with the second initialization voltage VAINT.

The eighth transistor T8 may include a first electrode connected to the anode of the second light-emitting element ED2, a second electrode connected to the fifth voltage line VL5, and a gate electrode connected to the black gate line GBL. The eighth transistor T8 may be turned on in response to the black gate signal GB to provide the second initialization voltage VAINT to the anode of the second light-emitting element ED2. The eighth transistor T8 may initialize the anode of the second light-emitting element ED2 with the second initialization voltage VAINT.

The ninth transistor T9 may include a first electrode connected to the anode of the first light-emitting element ED1, a second electrode connected to the second electrode of the sixth transistor T6, and a gate electrode connected to a first selection line GSL1. The first selection line GSL1 may be a corresponding one of the plurality of first selection lines GSL11 to GSL1*n*. The ninth transistor T9 may be turned on in response to a first selection signal GS1.

In other words, the scan driving circuit 300 may control the emission of the first light-emitting element ED1 by the first selection signal GS1.

The tenth transistor T10 may include a first electrode connected to the anode of the second light-emitting element ED2, a second electrode connected to the second electrode of the sixth transistor T6, and a gate electrode connected to a second selection line GSL2. The second selection line GSL2 may be a corresponding one of the plurality of second selection lines GSL21 to GSL2n. The tenth transistor T10 may be turned on in response to a second selection signal GS2.

In other words, the scan driving circuit 300 may control the emission of the second light-emitting element ED2 by the second selection signal GS2.

The first light-emitting element ED1 may include an anode connected to the second electrode of the ninth transistor T9, a light-emitting layer, and a cathode connected to the second voltage line VL2.

The second light-emitting element ED2 may include an anode connected to the second electrode of the tenth transistor T10, a light-emitting layer, and a cathode connected to the second voltage line VL2.

The first light-emitting element ED1 and the second light-emitting element ED2, which are connected to the one pixel circuit PDC and controlled, may emit light of substantially the same color.

Each of the first light-emitting element ED1 and the second light-emitting element ED2 may selectively emit light depending on a mode. Unlike the first light-emitting element ED1, a plurality of light control layers may be disposed on the second light-emitting element ED2. This will be described later. Accordingly, in a driving environment in which the second light-emitting element ED2 emits light, the light emitted from the second light-emitting element ED2 may be in a viewing angle control environment in which the path of light is restricted by light control layers disposed on the second light-emitting element ED2.

In an embodiment of the disclosure, each of the first light-emitting element ED1 and the second light-emitting element ED2 may be selectively driven in a first mode or a second mode. In this case, the first mode may be defined as a public mode, and the second mode may be defined as a private mode. The private mode may be a viewing angle control environment mode.

In the first mode, both the first light-emitting element ED1 and the second light-emitting element ED2 may be turned on. In an embodiment of the disclosure, in the first mode, both the first light-emitting element ED1 and the second light-emitting element ED2 may be turned on in the display device DD (refer to FIG. 1A). For this reason, the number of light-emitting elements per given area may be increased. The pixels per inch (PPI) of the display device DD (refer to FIG. 1A) may be increased. Accordingly, the display device DD (refer to FIG. 1A) having relatively high resolution may be provided.

In the second mode, the first light-emitting element ED1 may be turned off and the second light-emitting element ED2 may be turned on.

Figure 7:
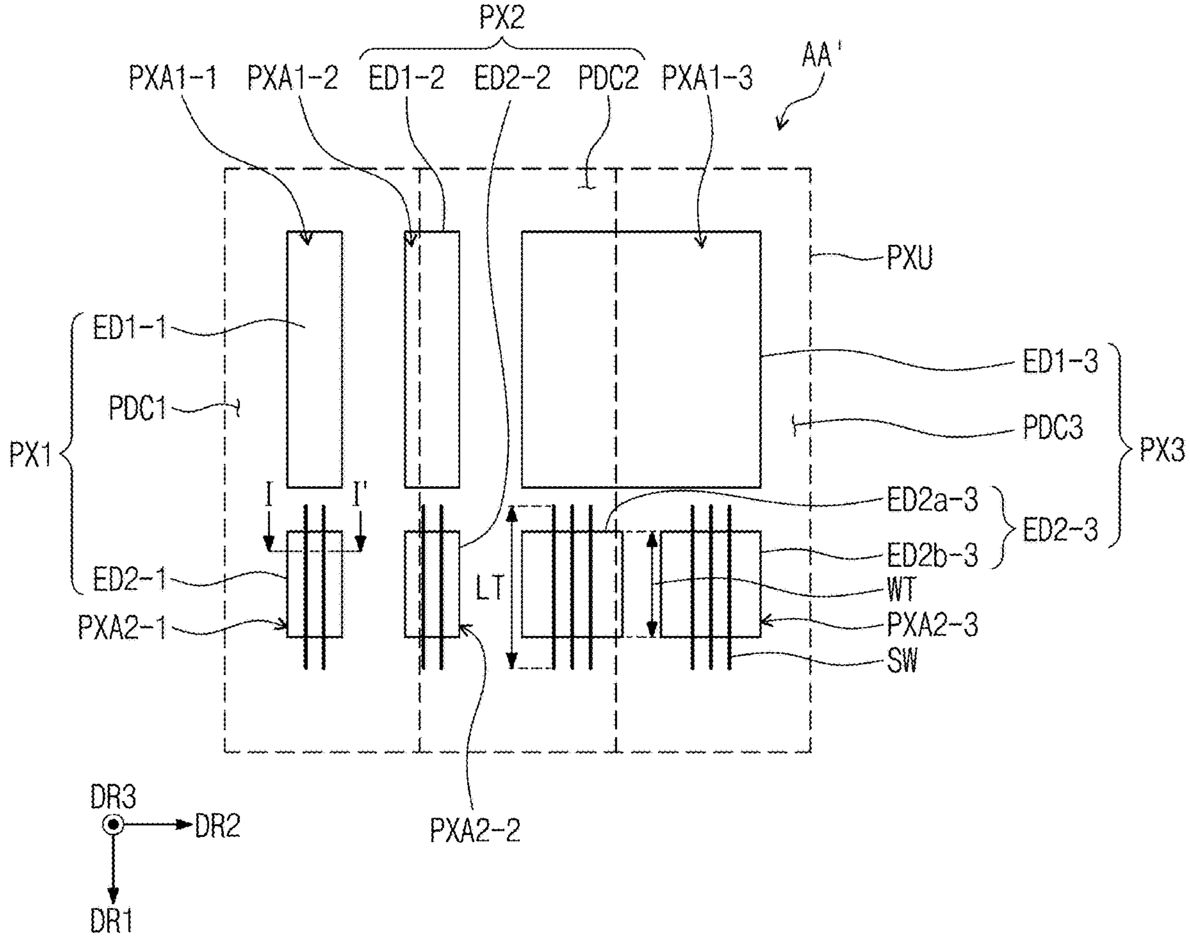
FIG. 7 is a plan view illustrating area AA' of an embodiment of FIG. 1A, according to the disclosure.

FIG. 7 is a plan view illustrating area AA' of an embodiment of FIG. 1A, according to the disclosure.

Referring to FIGS. 2 and 7, the display panel DP may include a pixel unit PXU. The plurality of pixel units PXU may be provided and may be arranged repeatedly in the first direction DR1 and the second direction DR2.

The pixel unit PXU may include the plurality of pixels PX. In an embodiment, the plurality of pixels PX may include a first pixel PX1, a second pixel PX2, and a third pixel PX3, for example.

The first pixel PX1 may include a first pixel circuit PDC1, a 1-1st light-emitting element ED1-1 electrically connected to the first pixel circuit PDC1, and a 2-1st light-emitting element ED2-1 electrically connected to the first pixel circuit PDC1.

In a plan view, the 1-1st light-emitting element ED1-1 and the 2-1st light-emitting element ED2-1 may be spaced apart from each other in the first direction DR1.

The 1-1st light-emitting element ED1-1 may emit first light through a 1-1st emission area PXA1-1. In an embodiment, the first light may be red light, for example.

The 2-1st light-emitting element ED2-1 may emit the first light through a 2-1st emission area PXA2-1.

In a plan view, the area size of the 1-1st emission area PXA1-1 may be larger than the area size of the 2-1st emission area PXA2-1.

In a plan view, the 1-1st light-emitting element ED1-1 may not overlap separating walls SW included in the optical path control layer OSL (refer to FIG. 5A), and the 2-1st light-emitting element ED2-1 may overlap the separating walls SW.

The second pixel PX2 may include a second pixel circuit PDC2, a 1-2nd light-emitting element ED1-2 electrically connected to the second pixel circuit PDC2, and a 2-2nd light-emitting element ED2-2 electrically connected to the second pixel circuit PDC2.

In a plan view, the 1-2nd light-emitting element ED1-2 and the 2-2nd light-emitting element ED2-2 may be spaced apart from each other in the first direction DR1.

The 1-2nd light-emitting element ED1-2 may emit second light different from the first light through a 1-2nd emission area PXA1-2. In an embodiment, the second light may be green light, for example.

The 2-2nd light-emitting element ED2-2 may emit the second light through a 2-2nd emission area PXA2-2.

In a plan view, the area size of the 1-2nd emission area PXA1-2 may be larger than the area size of the 2-2nd emission area PXA2-2.

In a plan view, the 1-2nd light-emitting element ED1-2 may not overlap separating walls SW, and the 2-2nd light-emitting element ED2-2 may overlap the separating walls SW.

The third pixel PX3 may include a third pixel circuit PDC3, a 1-3rd light-emitting element ED1-3 electrically connected to the third pixel circuit PDC3, and a 2-3rd light-emitting element ED2-3 electrically connected to the third pixel circuit PDC3.

The 2-3rd light-emitting element ED2-3 may include a first emission portion ED2a-3 and a second emission portion ED2b-3. In a plan view, the first emission portion ED2a-3 and the second emission portion ED2b-3 may be spaced apart from each other in the second direction DR2.

In a plan view, the 1-3rd light-emitting element ED1-3 may be spaced apart from the first emission portion ED2a-3 and the second emission portion ED2b-3 in the first direction DR1.

In a plan view, the first pixel circuit PDC1, the second pixel circuit PDC2, and the third pixel circuit PDC3 may be arranged in the second direction DR2.

The 1-3rd light-emitting element ED1-3 may emit third light, which is different from the first light and the second light, through a 1-3rd emission area PXA1-3. In an embodiment, the third light may be blue light, for example.

Each of the first emission portion ED2a-3 and the second emission portion ED2b-3 may emit the third light through a 2-3rd emission area PXA2-3.

In a plan view, the area size of the 1-3rd emission area PXA1-3 may be larger than that of the 2-3rd emission area PXA2-3.

In a plan view, the 1-3rd light-emitting element ED1-3 may not overlap the separating walls SW, and each of the first emission portion ED2*a*-3 and the second emission portion ED2*b*-3 may overlap the separating walls SW.

Each of the plurality of separating walls SW may extend in the first direction DR1. The plurality of separating walls SW may be spaced apart from each other in the second direction DR2. In an embodiment, an extension direction of each of the plurality of separating walls SW may be perpendicular to a direction of a viewing angle thus controlled, for example.

A width WT of the first direction DR1 of each of the 2-1st emission area PXA2-1, the 2-2nd emission area PXA2-2, and the 2-3rd emission area PXA2-3 may be smaller than a length LT of the first direction DR1 of each of the plurality of separating walls SW.

Figure 8A:
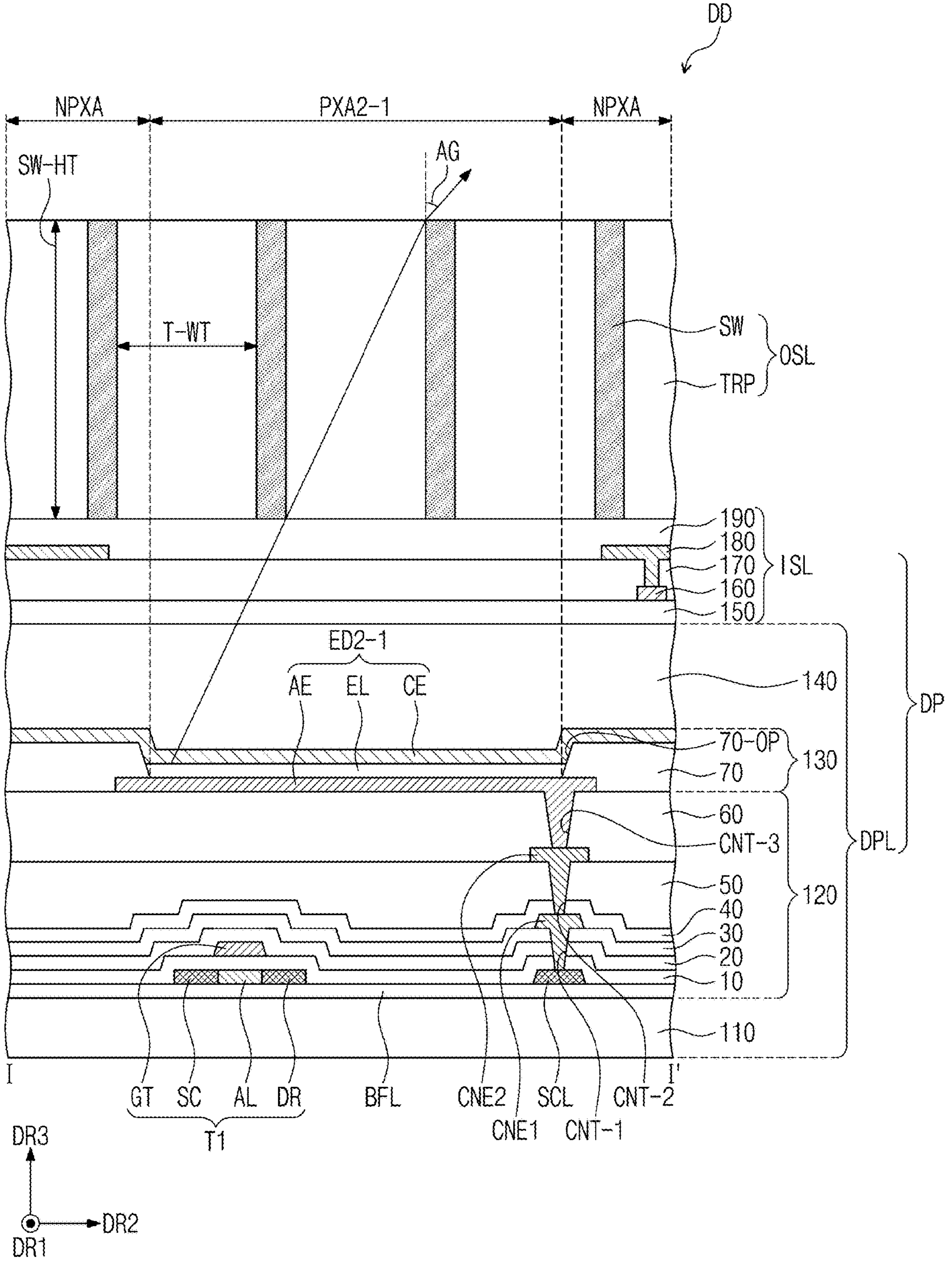
FIG. 8A is a cross-sectional view of an embodiment of a display device taken along I-I' of FIG. 7, according to the disclosure.

FIG. 8A is a cross-sectional view of an embodiment of a display device taken along I-I' of FIG. 7, according to the disclosure.

Referring to FIG. 8A, the display layer DPL may include the base layer 110, the circuit layer 120, the light-emitting element layer 130, and the encapsulation layer 140.

The base layer 110 may be a member that provides a base surface on which the circuit layer 120 is disposed. The base layer 110 may include a synthetic resin layer. The synthetic resin layer may be a polyimide-based resin layer, and the material thereof is not particularly limited thereto. In addition, the base layer 110 may include a glass substrate, a metal substrate, or an organic/inorganic composite substrate.

At least one inorganic layer is formed on an upper surface of the base layer 110. The inorganic layer may include at least one of aluminum oxide, titanium oxide, silicon oxide, silicon nitride, silicon oxynitride, zirconium oxide, and hafnium oxide. The inorganic layer may include or consist of multiple layers. The multiple inorganic layers may constitute a barrier layer and/or a buffer layer. In an embodiment, the display layer DPL is illustrated as including a buffer layer BFL.

The buffer layer BFL may improve a bonding force between the base layer 110 and a semiconductor pattern. The buffer layer BFL may include at least one of silicon oxide, silicon nitride, and silicon oxynitride. In an embodiment, the buffer layer BFL may include a structure in which a silicon oxide layer and a silicon nitride layer are stacked alternately, for example.

The semiconductor pattern may be disposed on the buffer layer BFL. The semiconductor pattern may include polysilicon. However, the disclosure is not limited thereto, and the semiconductor pattern may include amorphous silicon, LTPS, or an oxide semiconductor.

FIG. 8A only illustrates a part of the semiconductor pattern, and the semiconductor pattern may be further disposed in another area. The semiconductor patterns may be arranged across pixels in a predetermined rule. The semiconductor pattern may have electrical characteristics different depending on whether the semiconductor pattern is doped. The semiconductor pattern may include a first area having relatively high conductivity and a second area having relatively low conductivity. The first area may be doped with an N-type dopant or a P-type dopant. A P-type transistor may include an area doped with the P-type dopant, and an N-type transistor may include an area doped with the N-type dopant. The second area may be an undoped area or an area doped with a concentration lower than a concentration in the first area.

The conductivity of the first area is greater than the conductivity of the second area. The first area may substantially serve as an electrode or a signal line. The second area may substantially correspond to an active area (or a channel) of a transistor. In other words, a portion of the semiconductor pattern may be an active area of a transistor, another portion thereof may be a source area or a drain area of the transistor, and another portion thereof may be a connection electrode or a connection signal line.

FIG. 8A shows the one transistor T1 and one light-emitting element ED2-1 included in a pixel.

A source area SC, an active area AL (alternatively, also referred to as "active"), and a drain area DR of the transistor T1 may be formed from the semiconductor pattern. The source area SC and the drain area DR may extend in directions opposite to each other from the active area AL in a cross-sectional view. A portion of a connection signal wire SCL formed from the semiconductor pattern is illustrated in FIG. 8A. Although not separately illustrated, the connection signal wire SCL may be connected to the drain area DR of the transistor T1 in a plan view.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer, and may have a single-layer structure or a multi-layer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a silicon oxide layer having a single-layer structure. Not only the first insulating layer 10 but also an insulating layer of the circuit layer 120 to be described later may be an inorganic layer and/or an organic layer, and may have a single-layer structure or a multi-layer structure. The inorganic layer may include at least one of the above-described materials, but is not limited thereto.

A gate electrode GT of the transistor T1 is disposed on the first insulating layer 10. The gate electrode GT may be a part of a metal pattern. The gate electrode GT overlaps the active area AL. In a process of doping the semiconductor pattern, the gate electrode GT may function as a mask.

A second insulating layer 20 is disposed on the first insulating layer 10 and may cover the gate electrode GT. The second insulating layer 20 may overlap pixels in common. The second insulating layer 20 may be an inorganic layer and/or an organic layer, and may have a single-layer structure or a multi-layer structure. The second insulating layer 20 may include at least one of silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer structure or a multi-layer structure. In an embodiment, the third insulating layer 30 may have a multi-layer structure including a silicon oxide layer and a silicon nitride layer, for example.

A first connection electrode CNE1 may be disposed on the third insulating layer 30. The first connection electrode CNE1 may be connected to the connection signal wire SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The stacking relationship of the circuit layer 120 illustrated in FIG. 8A is only an illustrative embodiment and is not particularly limited thereto. In an embodiment, at least one of the first to sixth insulating layers 10, 20, 30, 40, 50, and 60 may be omitted, or other insulating layers may be further added, for example.

The light-emitting element layer 130 may be disposed on the circuit layer 120. The light-emitting element layer 130 may include a light-emitting element ED2-1. In an embodiment, the light-emitting element layer 130 may include an organic luminescent material, an inorganic luminescent material, an organic-inorganic luminescent material, a quantum dot, a quantum rod, a micro-LED, or a nano-LED, for example. Hereinafter, it is described that the light-emitting element ED2-1 is an organic light-emitting element, but is not particularly limited thereto.

The light-emitting element ED2-1 may include an anode AE (also referred to as a "first electrode"), a light-emitting layer EL, and a cathode CE (also referred to as a "second electrode").

The first electrode AE may be disposed on the sixth insulating layer 60. The first electrode AE may be connected to the second connection electrode CNE2 through a contact hole CNT-3 penetrating the sixth insulating layer 60.

A pixel defining film 70 may be disposed on the sixth insulating layer 60 and may cover a portion of the first electrode AE. An opening 70-OP is defined in the pixel defining film 70. The opening 70-OP of the pixel defining film 70 exposes at least part of the first electrode AE.

The display area DA (refer to FIG. 2) may include a 2-1st emission area (hereinafter also referred to as "emission area") PXA2-1 and a non-emission area NPXA next (adjacent) to the emission area PXA2-1. The non-emission area NPXA may surround the emission area PXA2-1. In an embodiment, the emission area PXA2-1 is defined to correspond to a partial area of the first electrode AE, which is exposed by the opening 70-OP.

The light-emitting layer EL may be disposed on the first electrode AE. The light-emitting layer EL may be disposed in an area corresponding to the opening 70-OP. That is, the light-emitting layer EL may be separately formed on each of pixels. When the light-emitting layers EL are separately formed in each of pixels, each of the light-emitting layers EL may emit light of at least one of a blue color, a red color, and a green color. However, the disclosure is not limited thereto. In an embodiment, the light-emitting layer EL may be connected and provided to each of the pixels in common. In this case, the light-emitting layer EL may provide blue light or white light, for example.

The second electrode CE may be disposed on the light-emitting layer EL. The second electrode CE may be integrally disposed in a plurality of pixels in common.

Although not illustrated, a hole control layer may be interposed between the first electrode AE and the light-emitting layer EL. The hole control layer may be disposed in common in the emission area PXA2-1 and the non-emission area NPXA. The hole control layer may include a hole transport layer and may further include a hole injection layer. An electron control layer may be interposed between the light-emitting layer EL and the second electrode CE. The electron control layer may include an electron transport layer, and may further include an electron injection layer. The hole control layer and the electron control layer may be formed in common in a plurality of pixels by an open mask.

The encapsulation layer 140 may be disposed on the light-emitting element layer 130. The encapsulation layer 140 may include an inorganic layer, an organic layer, and an inorganic layer sequentially stacked, and layers constituting the encapsulation layer 140 are not limited thereto.

The inorganic layers may protect the light-emitting element layer 130 from moisture and oxygen, and the organic layer may protect the light-emitting element layer 130 from a foreign material such as dust particles. The inorganic layers may include a silicon nitride layer, a silicon oxynitride layer, a silicon oxide layer, a titanium oxide layer, an aluminum oxide layer, or the like. The organic layer may include, but is not limited to, an acrylic-based organic layer.

The sensor layer ISL may include a base layer 150, a first conductive layer 160, a sensing insulating layer 170, a second conductive layer 180, and a cover insulating layer 190.

The base layer 150 may be an inorganic layer including at least one of silicon nitride, silicon oxynitride, and silicon oxide. In an alternative embodiment, the base layer 150 may be an organic layer including an epoxy resin, an acrylate resin, or an imide-based resin. The base layer 150 may have a single-layer structure or may have a multi-layer structure stacked in the third direction DR3. In an embodiment, the base layer 150 may be omitted.

Each of the first conductive layer 160 and the second conductive layer 180 may have a single-layer structure or may have a multi-layer structure in which layers are stacked in the third direction DR3.

A conductive layer of a single-layer structure may include a metal layer or a transparent conductive layer. The metal layer may include molybdenum, silver, titanium, copper, aluminum, or any alloys thereof. The transparent conductive layer may include a transparent conductive oxide such as indium tin oxide ("ITO"), indium zinc oxide ("IZO"), zinc oxide (ZnO), indium zinc tin oxide ("IZTO"), or the like. Besides, the transparent conductive layer may include a conductive polymer such as poly(3,4-ethylenedioxythiophene) ("PEDOT"), a metal nano wire, graphene, or the like.

A conductive layer of the multi-layer structure may include metal layers. In an embodiment, the metal layers may have a three-layer structure of titanium/aluminum/titanium, for example. The conductive layer of the multi-layer structure may include at least one metal layer and at least one transparent conductive layer.

At least one of the sensing insulating layer 170 and the cover insulating layer 190 may include an inorganic film. The inorganic film may include at least one of aluminum oxide, titanium oxide, silicon oxide, silicon nitride, silicon oxynitride, zirconium oxide, and hafnium oxide.

At least one of the sensing insulating layer 170 and the cover insulating layer 190 may include an organic film. The organic film may include at least one of acrylate-based resin, methacrylate-based resin, polyisoprene, vinyl-based resin, epoxy-based resin, urethane-based resin, cellulose-based resin, siloxane-based resin, polyimide-based resin, polyamide-based resin, and perylene-based resin.

The optical path control layer OSL may include the plurality of separating walls SW and a transmission portion TRP between the plurality of separating walls SW. The first light-emitting elements ED1-1 illustrated in FIG. 7 may not overlap the plurality of separating walls SW. In an embodiment of the disclosure, the first light-emitting elements ED1-1 may overlap the transmission portion TRP.

The plurality of separating walls SW may include a light-absorbing material or a light-blocking material. In an embodiment, light incident on the plurality of separating walls SW may not be reflected but may be absorbed by the plurality of separating walls SW, for example. The transmission portion TRP may include a transparent organic material.

A height SW-HT of each of the plurality of separating walls SW may be twice or more a width T-WT of the transmission portion TRP between two neighboring (adjacent) separating walls SW among the plurality of separating walls SW.

Figure 8B:
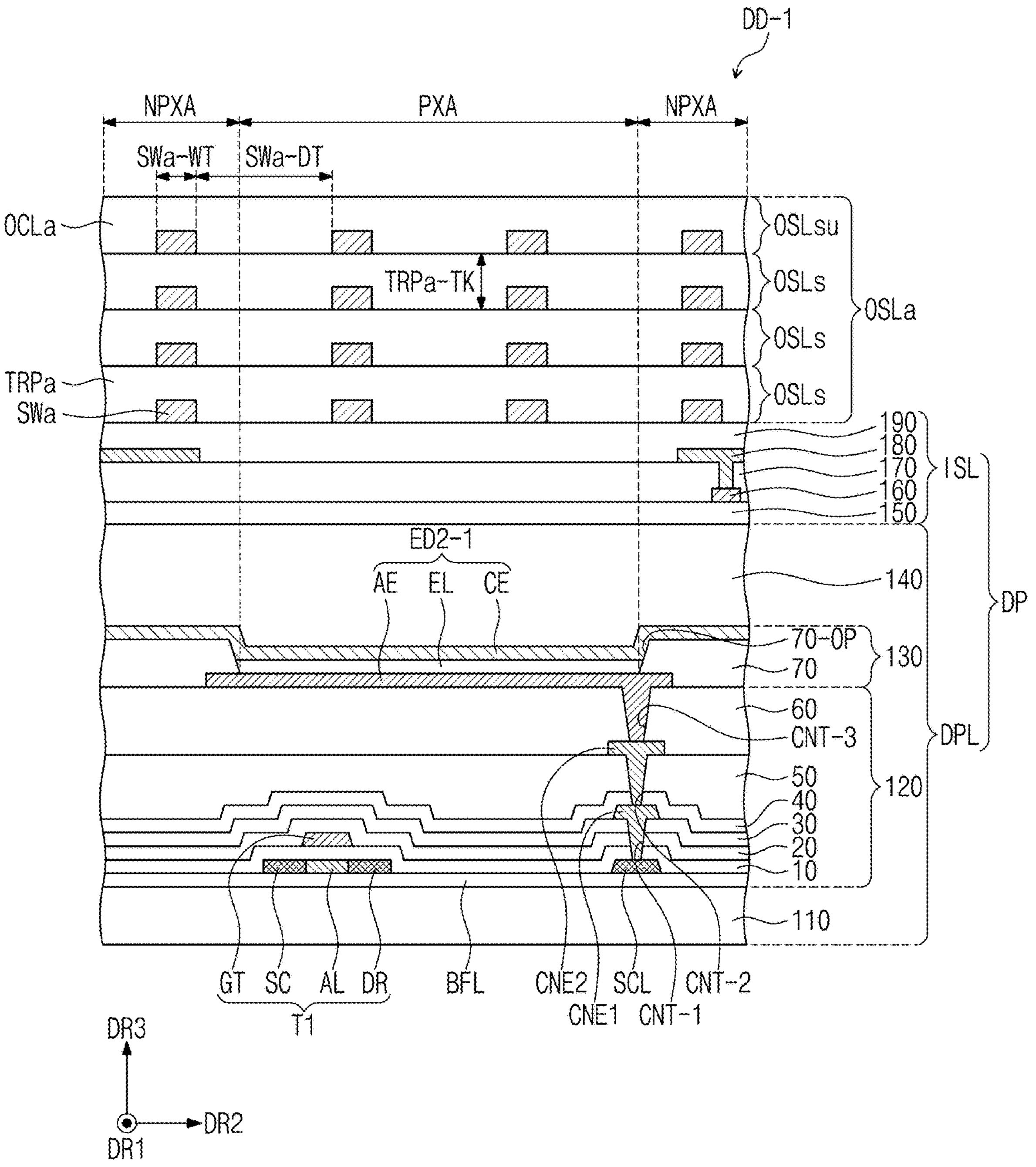
FIG. 8B is a cross-sectional view of an embodiment of a display device taken along line corresponding to I-I' of FIG. 7, according to the disclosure.

FIG. 8B is a cross-sectional view of an embodiment of a display device taken along I-I' of FIG. 7, according to the disclosure. In the description of FIG. 8B, the same reference numerals are assigned to the same components described with reference to FIG. 8A, and thus the descriptions thereof are omitted to avoid redundancy.

Referring to FIG. 8B, a display device DD-1 may include the display panel DP and an optical path control layer OSLa.

The optical path control layer OSLa may include a plurality of sub-optical path control layers OSLs and OSLsu. In FIG. 8B, the optical path control layer OSLa is illustrated as including four sub-optical path control layers OSLs and OSLsu, but is not particularly limited thereto.

The plurality of sub-optical path control layers OSLs and OSLsu may be sequentially stacked in a direction away from the light-emitting element ED2-1. The uppermost sub-optical path control layer OSLsu among the sub-optical path control layers OSLs and OSLsu may include a plurality of separating walls SWa and an overcoating layer OCLa covering the separating walls SWa. Each of the three remaining sub-optical path control layers OSLs may include the plurality of separating walls SWa and a transmitting layer TRPa covering the separating walls SWa. The plurality of separating walls SWa may include a light-absorbing material or a light-blocking material. In an embodiment, light incident on the plurality of separating walls SWa may not be reflected but may be absorbed by the plurality of separating walls SWa, for example. Each of the overcoating layer OCLa and the transmitting layer TRPa may include a transparent organic material.

The number of sub-optical path control layers OSLs and OSLsu included in the optical path control layer OSLa, an interval SWa-DT between the plurality of separating walls SWa, a width SWa-WT of each of the plurality of separating walls SWa, or a thickness TRPa-TK of the transmitting layer TRPa may be controlled depending on the viewing angle control angle AG.

Figure 9:
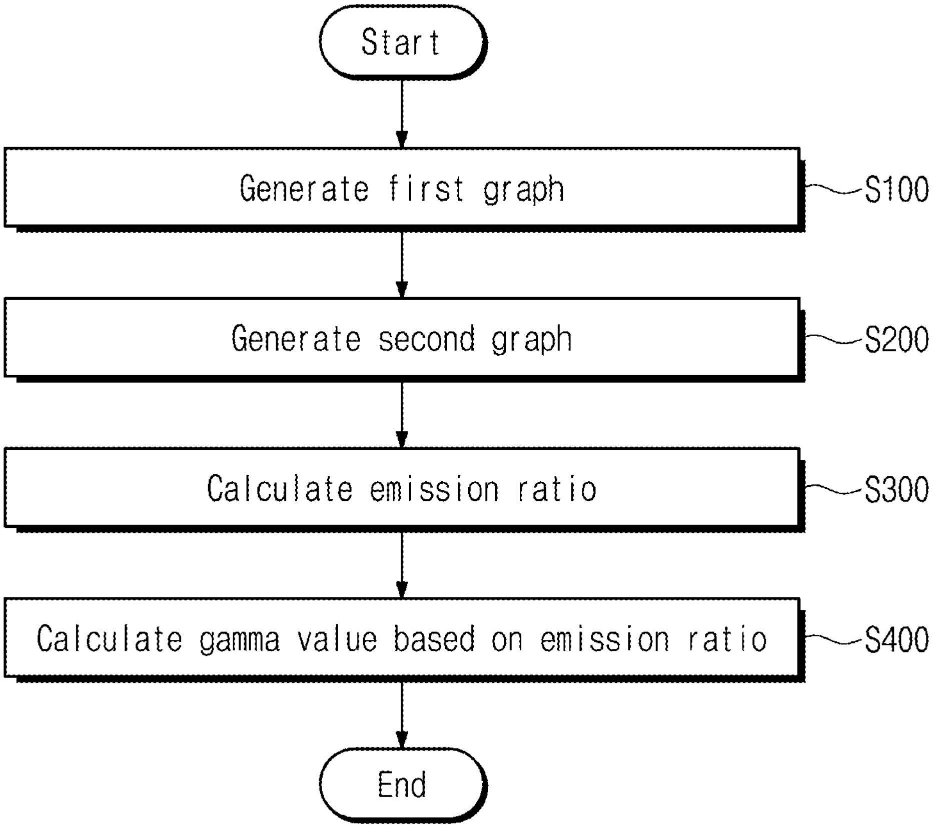
FIG. 9 is a flowchart illustrating an embodiment of a method of driving a display device, according to the disclosure.

FIG. 9 is a flowchart illustrating an embodiment of a method of driving a display device, according to the disclosure.

Referring to FIGS. 2 and 9, a method for driving the display device DD in an embodiment of the disclosure may include operation S100 of generating a first graph, operation S200 of generating a second graph, operation S300 of calculating an emission ratio based on the first graph and the second graph, and operation S400 of calculating a gamma value based on the emission ratio.

Figure 10:
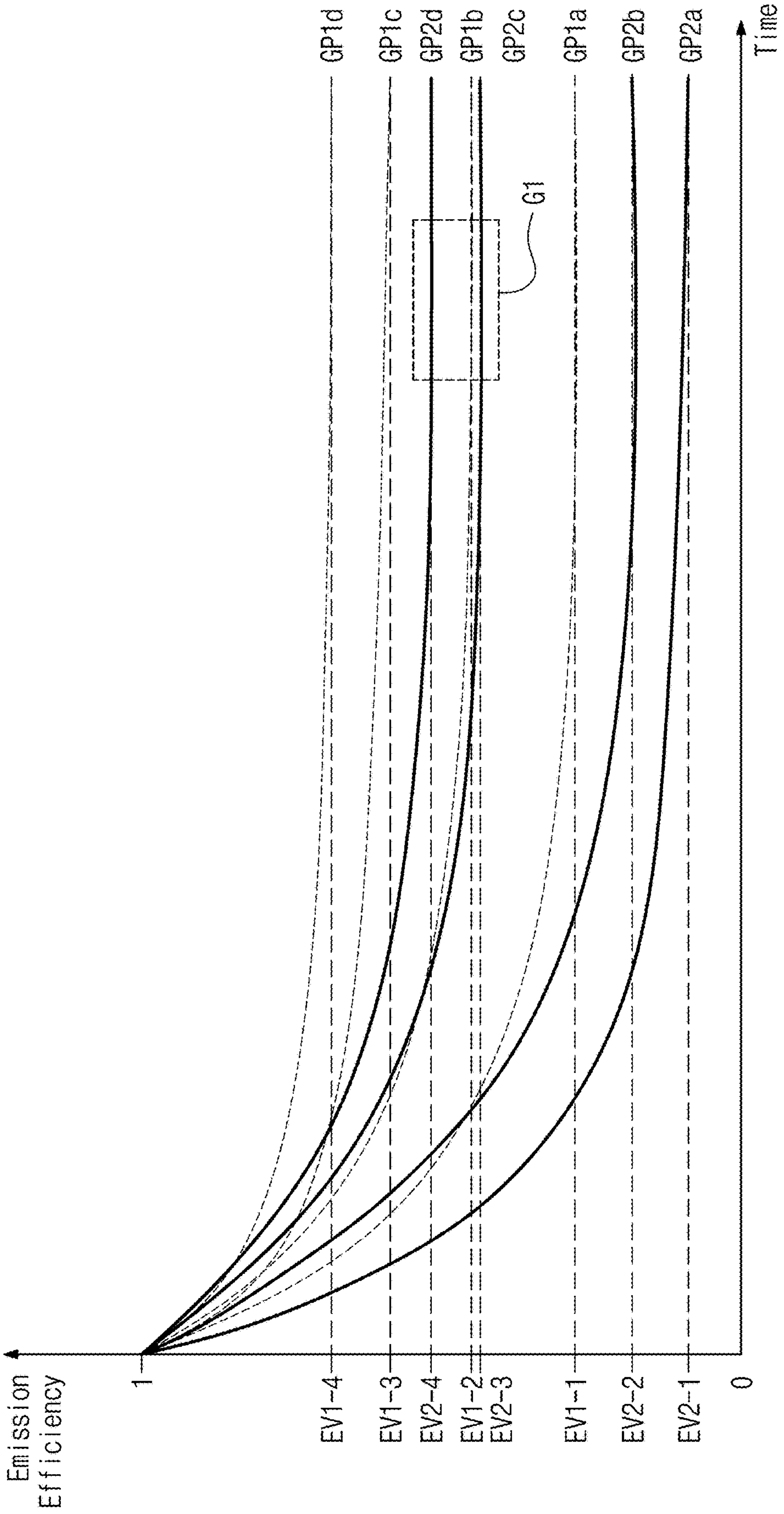
FIG. 10 illustrates an embodiment of a first graph and a second graph, according to the disclosure.
Figure 11:
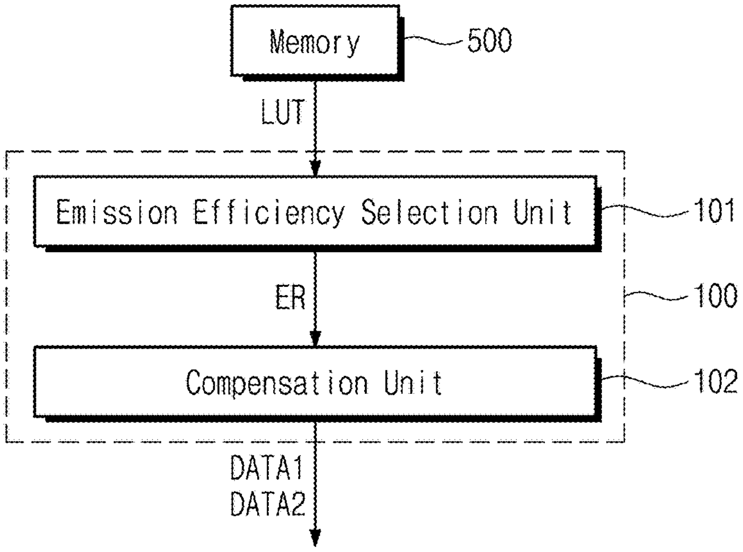
FIG. 11 is a block diagram illustrating an embodiment of a memory and a driving controller, according to the disclosure.

FIG. 10 illustrates an embodiment of a first graph and a second graph, according to the disclosure. FIG. 11 is a block diagram illustrating an embodiment of a memory and a driving controller, according to the disclosure.

Referring to FIGS. 2, 6, 9, 10, and 11, as stress applied to the plurality of pixels PX increases, luminance may decrease. In detail, as the cumulative run time (or cumulative driving amount) of each of the plurality of pixels PX increases, the cumulative stress applied to each of the plurality of pixels PX may increase. As the cumulative stress increases, the light-emitting layer EL (refer to FIG. 8A) of each of the plurality of pixels PX may deteriorate, thereby reducing luminance.

A plurality of first graphs GP1*a*, GP1*b*, GP1*c*, and GP1*d* may be generated by calculating the first emission efficiency according to the luminance-specific time of the first light-emitting element ED1 (S100). In an embodiment, a user may select one of a plurality of manufactured display panels and may extract the plurality of first graphs GP1*a*, GP1*b*, GP1*c*, and GP1*d*, for example. In this way, the first emission efficiency according to the time of the first light-emitting element ED1 of the remaining display panels among the plurality of display panels may be allowed to be inferred.

The plurality of first graphs GP1*a*, GP1*b*, GP1*c*, and GP1*d* may be stored in the memory 500 of each of the remaining display panels among the plurality of display panels. The plurality of first graphs GP1*a*, GP1*b*, GP1*c*, and GP1*d* may be provided to the driving controller 100 as the lookup table LUT.

The plurality of first graphs GP1*a*, GP1*b*, GP1*c*, and GP1*d* may include the 1-1st graph GP1*a*, the 1-2nd graph GP1*b*, the 1-3rd graph GP1*c*, and the 1-4th graph GP1*d*.

The 1-1st graph GP1*a* is a graph obtained by measuring the first emission efficiency over time when the first light-emitting element ED1 emits light at 100% of the maximum luminance. For the first time, the first emission efficiency of the first light-emitting element ED1 may have a value of 1. As time goes on, the first emission efficiency of the first light-emitting element ED1 may decrease and then may be saturated to a 1-1st efficiency value EV1-1.

The 1-2nd graph GP1*b* is a graph obtained by measuring the first emission efficiency over time when the first light-emitting element ED1 emits light at 70% of the maximum luminance. For the first time, the first emission efficiency of the first light-emitting element ED1 may have a value of 1. As time goes on, the first emission efficiency of the first light-emitting element ED1 may decrease and then may be saturated to a 1-2nd efficiency value EV1-2 higher than the 1-1st efficiency value EV1-1.

The 1-3rd graph GP1*c* is a graph obtained by measuring the first emission efficiency over time when the first light-emitting element ED1 emits light at 50% of the maximum luminance. For the first time, the first emission efficiency of the first light-emitting element ED1 may have a value of 1. As time goes on, the first emission efficiency of the first light-emitting element ED1 may decrease and then may be saturated to a 1-3rd efficiency value EV1-3 higher than the 1-2nd efficiency value EV1-2.

The 1-4th graph GP1*d* is a graph obtained by measuring the first emission efficiency over time when the first light-emitting element ED1 emits light at 30% of the maximum luminance. For the first time, the first emission efficiency of the first light-emitting element ED1 may have a value of 1. As time goes on, the first emission efficiency of the first light-emitting element ED1 may decrease and then may be saturated to a 1-4th efficiency value EV1-4 higher than the 1-3rd efficiency value EV1-3.

The first area size of the emission area of the second light-emitting element ED2 may be smaller than the second area size of the emission area of the first light-emitting element ED1. For this reason, to achieve the desired luminance, the second light-emitting element ED2 needs to emit light to be brighter than the first light-emitting element ED1. The deterioration speed of the second light-emitting element ED2 may be faster than the deterioration speed of the first light-emitting element ED1.

The second light-emitting element ED2 may be saturated to a lower efficiency value than the first light-emitting element ED1.

A plurality of second graphs GP2*a*, GP2*b*, GP2*c*, and GP2*d* may be generated by calculating the second emission efficiency according to the luminance-specific time of the second light-emitting element ED2 (S200). In an embodiment, a user may select one of a plurality of manufactured display panels and may extract the plurality of second graphs GP2*a*, GP2*b*, GP2*c*, and GP2*d*, for example. In this way, the second emission efficiency according to the time of the second light-emitting element ED2 of the remaining display panels among the plurality of display panels may be allowed to be inferred.

The plurality of second graphs GP2*a*, GP2*b*, GP2*c*, and GP2*d* may be stored in the memory 500 of each of the remaining display panels among the plurality of display panels. The plurality of second graphs GP2*a*, GP2*b*, GP2*c*, and GP2*d* may be provided to the driving controller 100 as the lookup table LUT.

The plurality of second graphs GP2*a*, GP2*b*, GP2*c*, and GP2*d* may include the 2-1st graph GP2*a*, the 2-2nd graph GP2*b*, the 2-3rd graph GP2*c*, and the 2-4th graph GP2*d*.

The 2-1st graph GP2*a* is a graph obtained by measuring the second emission efficiency over time when the second light-emitting element ED2 emits light at 100% of the maximum luminance. For the first time, the second emission efficiency of the second light-emitting element ED2 may have a value of 1. As time goes on, the second emission efficiency of the second light-emitting element ED2 may decrease and then may be saturated to a 2-1st efficiency value EV2-1.

The 2-2nd graph GP2*b* is a graph obtained by measuring the second emission efficiency over time when the second light-emitting element ED2 emits light at 70% of the maximum luminance. For the first time, the second emission efficiency of the second light-emitting element ED2 may have a value of 1. As time goes on, the second emission efficiency of the second light-emitting element ED2 may decrease and then may be saturated to a 2-2nd efficiency value EV2-2 higher than the 2-1st efficiency value EV2-1.

The 2-3rd graph GP2*c* is a graph obtained by measuring the second emission efficiency over time when the second light-emitting element ED2 emits light at 50% of the maximum luminance. For the first time, the second emission efficiency of the second light-emitting element ED2 may have a value of 1. As time goes on, the second emission efficiency of the second light-emitting element ED2 may decrease and then may be saturated to a 2-3rd efficiency value EV2-3 higher than the 2-2nd efficiency value EV2-2.

The 2-4th graph GP2*d* is a graph obtained by measuring the second emission efficiency over time when the second light-emitting element ED2 emits light at 30% of the maximum luminance. For the first time, the second emission efficiency of the second light-emitting element ED2 may have a value of 1. As time goes on, the second emission efficiency of the second light-emitting element ED2 may decrease and then may be saturated to a 2-4th efficiency value EV2-4 higher than the 2-3rd efficiency value EV2-3.

The display device DD may operate in a first mode or a second mode different from the first mode. In the first mode, the first light-emitting element ED1 and the second light-emitting element ED2 may emit light. In the second mode, only the second light-emitting element ED2 may emit light.

When operating in the first mode, the driving controller 100 may output a first gamma value DATA1 applied to the first light-emitting element ED1 and a second gamma value DATA2 applied to the second light-emitting element ED2.

The driving controller 100 may include an emission efficiency selection unit 101 and a compensation unit 102.

The emission efficiency selection unit 101 may receive the lookup table LUT from the memory 500. The emission efficiency selection unit 101 may calculate an emission ratio ER based on the plurality of first graphs GP1*a*, GP1*b*, GP1*c*, and GP1*d* and the plurality of second graphs GP2*a*, GP2*b*, GP2*c*, and GP2*d*, which are included in the lookup table LUT (S300).

The emission efficiency selection unit 101 may extract a plurality of graphs G1 in which the deterioration amount of the first light-emitting element ED1 is similar to the deterioration amount of the second light-emitting element ED2. When the emission efficiency saturated after a period of time has a similar efficiency value, the emission efficiency selection unit 101 may determine that the deterioration amount is similar. The plurality of graphs G1 may be graphs in which the plurality of first graphs GP1*a*, GP1*b*, GP1*c*, and GP1*d* are next (adjacent) to the plurality of second graphs GP2*a*, GP2*b*, GP2*c*, and GP2*d* at a predetermined time.

The plurality of graphs G1 may include at least one of the plurality of first graphs GP1*a*, GP1*b*, GP1*c*, and GP1*d* and at least one of the plurality of second graphs GP2*a*, GP2*b*, GP2*c*, and GP2*d*. In an embodiment, the plurality of graphs G1 may include the 1-2nd graph GP1*b*, the 2-3rd graph GP2*c*, and the 2-4th graph GP2*d*, for example.

The emission efficiency selection unit 101 may select a first graph and a second graph, which have the highest emission efficiency, from among the plurality of graphs G1. In an embodiment, the emission efficiency selection unit 101 may select the 1-2nd graph GP1*b* saturated to the 1-2nd efficiency value and the 2-3rd graph GP2*c* saturated to the 2-3rd efficiency value, for example.

FIG. 10 illustrates the plurality of graphs G1 having one group, but the disclosure is not limited thereto. In an embodiment, the plurality of graphs G1 may be extracted as a plurality of groups, for example. In the case, after the first graph and the second graph with the highest emission efficiency are selected for each of the plurality of groups, a group with the highest emission efficiency may be selected from the first graph and the second graph of the selected one group and the first graph and the second graph of the selected other group.

The emission efficiency selection unit 101 may select a group, in which the sum of pieces of luminances of the first graph GP1*b* and the second graph GP2*c* or GP2*d* has the greatest value, from among the plurality of graphs G1. The emission efficiency selection unit 101 may calculate the emission ratio ER based on the 1-2nd graph GP1*b* and the 2-3rd graph GP2*c*, which are selected.

The emission ratio ER may be a luminance ratio between the first graph GP1*b* and the second graph GP2*c*, which are selected from the plurality of graphs G1.

The 1-2nd graph GP1*b* is a graph measured when the first light-emitting element ED1 emits light at 70% of the maximum luminance. The 2-3rd graph GP2*c* is a graph measured when the second light-emitting element ED2 emits light at 50% of the maximum luminance. The emission efficiency selection unit 101 may set the emission ratio ER based on the luminance of the first light-emitting element ED1 and the luminance of the second light-emitting element ED2. In an embodiment, the emission ratio ER may be set to 7:5, for example.

The compensation unit 102 may receive the emission ratio ER from the emission efficiency selection unit 101. The compensation unit 102 may calculate the first gamma value DATA1 and the second gamma value DATA2, which are respectively applied to the first light-emitting element ED1 and the second light-emitting element ED2, based on the emission ratio ER (S400).

The data signal DATA output by the driving controller 100 may include the first gamma value DATA1 and the second gamma value DATA2. The first gamma value DATA1 may be different from the second gamma value DATA2.

In the first mode, the first luminance of the first light-emitting element ED1 may be different from the second luminance of the second light-emitting element ED2. Because in the first mode, the first light-emitting element ED1 and the second light-emitting element ED2 emit light together, and the sum of pieces of luminance is perceived while the first light-emitting element ED1 and the second light-emitting element ED2 are disposed next (adjacent) to each other, a difference in luminance may not be perceived by a user even when the luminance of the first light-emitting element ED1 is different from the luminance of the second light-emitting element ED2.

Unlike an embodiment of the disclosure, the emission area of the second light-emitting element ED2 may be smaller than the emission area of the first light-emitting element ED1. The second light-emitting element ED2 may emit brighter light to achieve the desired luminance. In this case, the deterioration speed of the second light-emitting element ED2 may be faster than the deterioration speed of the first light-emitting element ED1. Deterioration of the second light-emitting element ED2 may be perceived by the user. However, in an embodiment according to the disclosure, the driving controller 100 may calculate the emission ratio ER based on deterioration curves of the first light-emitting element ED1 and the second light-emitting element ED2, and may calculate and output the gamma values DATA1 and DATA2 based on the emission ratio ER. In the first mode, the display device DD may emit light from the first light-emitting element ED1 and the second light-emitting element ED2 in consideration of a deterioration speed. The phenomenon that the deterioration of the second light-emitting element ED2 is perceived by the user due to a difference in the deterioration speed between the first light-emitting element ED1 and the second light-emitting element ED2 may be prevented. Accordingly, the display device DD with improved display quality and a driving method thereof may be provided.

Furthermore, in an embodiment according to the disclosure, the display device DD may synchronize the deterioration degree of the first light-emitting element ED1 with the deterioration degree of the second light-emitting element ED2 without being perceived by the user. The deterioration compensation amount of the plurality of pixels PX may be reduced in the compensation unit 102, thereby reducing the load applied to the plurality of pixels PX. Accordingly, it is possible to provide the display device DD with improved reliability and a driving method thereof.

When operating in the second mode, the driving controller 100 may output the gamma value applied to the second light-emitting element ED2.

The third luminance of the second light-emitting element ED2 in the second mode may be different from the second luminance of the second light-emitting element ED2 in the first mode. In an embodiment, the third luminance may be higher than the second luminance, for example. Because only the second light-emitting element ED2 emits light in the second mode, the second light-emitting element ED2 needs to emit light at the third luminance substantially the same as the luminance perceived when the first light-emitting element ED1 and the second light-emitting element ED2 emit light in the first mode. Accordingly, the third luminance may be higher than the second luminance.

Figure 12:
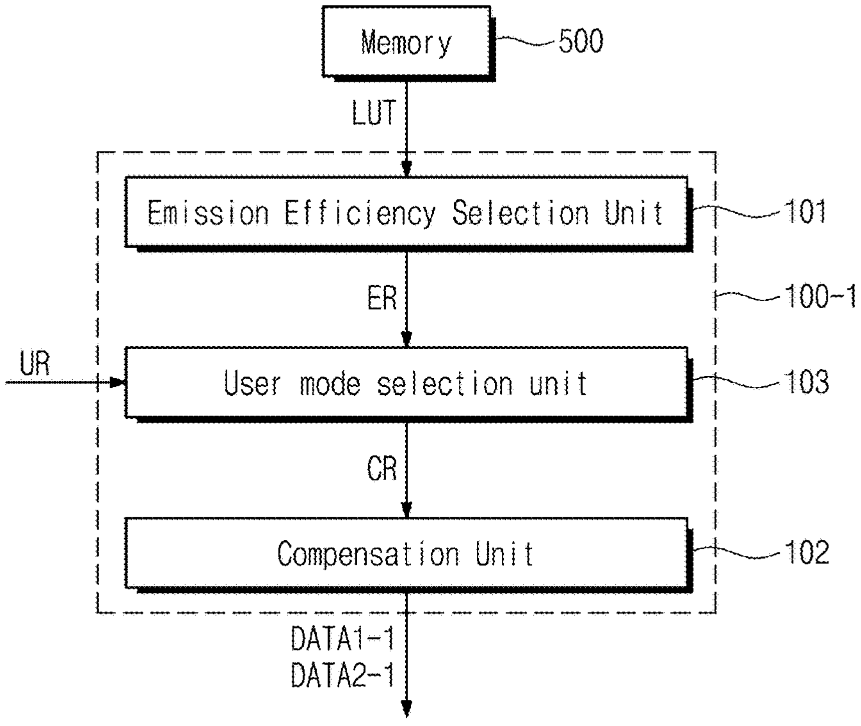
FIG. 12 is a block diagram illustrating an embodiment of a driving controller and a memory, according to the disclosure.

FIG. 12 is a block diagram illustrating an embodiment of a driving controller and a memory, according to the disclosure. In the description of FIG. 12, the same reference numerals are assigned to the same components described with reference to FIG. 11, and thus the descriptions thereof are omitted to avoid redundancy.

Referring to FIGS. 2, 6, and 12, a driving controller 100-1 may include the emission efficiency selection unit 101, a user mode selection unit 103, and the compensation unit 102.

The user mode selection unit 103 may receive a mode ratio UR. The mode ratio UR may be selected by a user. In an embodiment, the mode ratio UR may be defined as a ratio between a general mode and a privacy protection mode, for example.

In an embodiment, the mode ratio UR may be selected between the general mode of 100% & the privacy protection mode of 0% and the general mode of 0% & the privacy protection mode of 100%, for example. In this case, the sum of the ratio of the general mode and the ratio of the privacy protection mode may satisfy 100%.

The user mode selection unit 103 may receive the emission ratio ER and then may output a first correction ratio CR based on the emission ratio ER and the mode ratio UR. The user mode selection unit 103 may calculate the first correction ratio CR by multiplying the emission ratio ER by the mode ratio UR.

In an embodiment, when the emission ratio ER has a ratio of “x:y”, a user may set the mode ratio UR such that the general mode is 70% and the privacy protection mode is 30%, for example. In this case, the user mode selection unit 103 may output x' by multiplying x by “70/50” and may output y' by multiplying y by “30/50”. The user mode selection unit 103 may output x':y' as the first correction ratio CR.

The compensation unit 102 may receive the first correction ratio CR. The compensation unit 102 may calculate a first gamma value DATA1-1 and a second gamma value DATA2-1, which are respectively applied to the first light-emitting element ED1 and the second light-emitting element ED2, based on the first correction ratio CR.

In an embodiment of the disclosure, the driving controller 100-1 may calculate the emission ratio ER based on deterioration curves of the first light-emitting element ED1 and the second light-emitting element ED2 and may calculate and output first and second gamma values DATA1-1 and DATA2-1 based on the first correction ratio CR, which is obtained by applying the mode ratio UR selected by the user to the emission ratio ER. In the first mode, the display device DD may emit light from the first light-emitting element ED1 and the second light-emitting element ED2 in consideration of a deterioration speed. The phenomenon that the deterioration of the second light-emitting element ED2 is perceived by the user due to a difference in the deterioration speed between the first light-emitting element ED1 and the second light-emitting element ED2 may be prevented. Accordingly, the display device DD with improved display quality and a driving method thereof may be provided.

Moreover, according to the disclosure, the user may adjust the visibility according to the viewing angle by the mode ratio UR, which is a ratio between the general mode and the privacy protection mode. In an embodiment, when the user increases a ratio of the general mode, the luminance of the first light-emitting element ED1 perceived at the first viewing angle is greater than the luminance of the second light-emitting element ED2 perceived at the second viewing angle narrower than the first viewing angle, and thus the user may easily perceive an image even when viewing the display device DD at an angle exceeding the second viewing angle, for example. When the user increases the ratio of the privacy protection mode, the luminance of the second light-emitting element ED2 perceived at the second viewing angle is greater than the luminance of the first light-emitting element ED1 perceived at the first viewing angle, and thus, even in the first mode, the user may set the screen of the display device DD to be less visible to others at angles exceeding the second viewing angle. Accordingly, it is possible to provide the display device DD with improved user convenience, and a driving method thereof.

Figure 13:
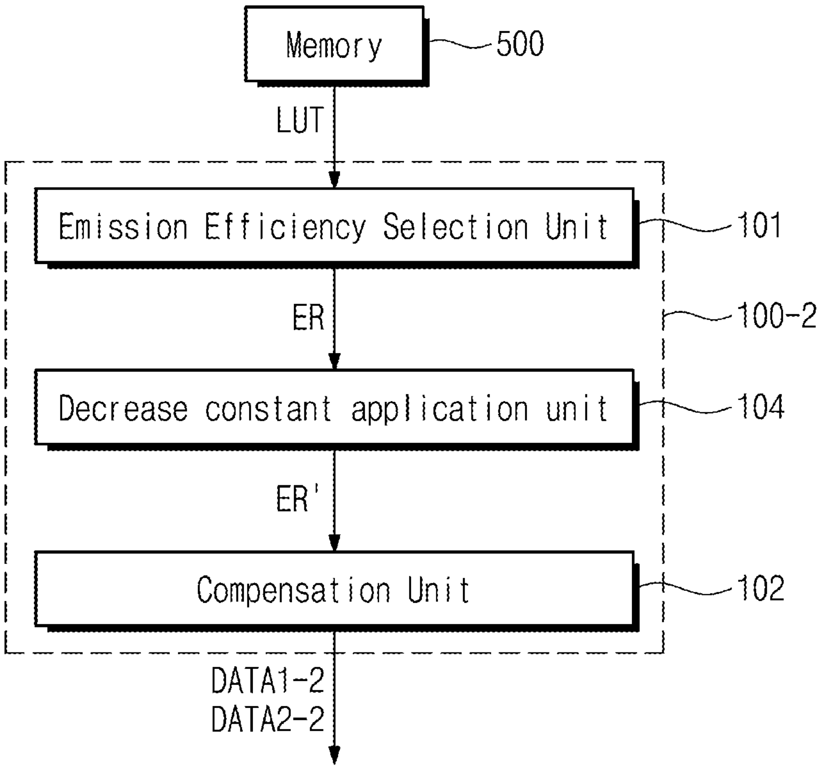
FIG. 13 is a block diagram illustrating an embodiment of a driving controller and a memory, according to the disclosure.

FIG. 13 is a block diagram illustrating an embodiment of a driving controller and a memory, according to the disclosure. In the description of FIG. 13, the same reference numerals are assigned to the same components described with reference to FIG. 11, and thus the descriptions thereof are omitted.

Referring to FIGS. 2, 6, and 13, a driving controller 100-2 may include the emission efficiency selection unit 101, a decrease constant application unit 104, and the compensation unit 102.

The decrease constant application unit 104 may receive the emission ratio ER. The decrease constant application unit 104 may calculate a second correction ratio ER' by further multiplying a value corresponding to the second light-emitting element ED2 in the emission ratio ER by a decrease constant. The decrease constant may have a value between 0 and 1.

In an embodiment, when the emission ratio ER has a ratio of "x:y" and the decrease constant has a value of r, the decrease constant application unit 104 may output "x:y times r (x:y×r)" as the second correction ratio ER', for example.

The compensation unit 102 may receive the second correction ratio ER'. The compensation unit 102 may calculate a first gamma value DATA1-2 and a second gamma value DATA2-2, which are respectively applied to the first light-emitting element ED1 and the second light-emitting element ED2, based on the second correction ratio ER'. In an embodiment, the first gamma value DATA1-2 may be substantially the same as the first gamma value DATA1 of an embodiment of FIG. 11, for example. The second gamma value DATA2-2 may be different from the second gamma value DATA2 of an embodiment of FIG. 11.

The light emitted from the second light-emitting element ED2 may be reflected by the separating walls SW. For this reason, the second light-emitting element ED2 may have relatively high luminance perceived by a user compared to actual emission efficiency and may cause a flash. In an embodiment of the disclosure, the decrease constant application unit 104 may apply the decrease constant in consideration of the flash, and the compensation unit 102 may calculate the second gamma value DATA2-2 based on the second correction ratio ER' that is corrected. The second light-emitting element ED2 may emit light based on the second gamma value DATA2-2. Accordingly, the display device DD with improved display quality and a driving method thereof may be provided.

In an embodiment of the disclosure, the driving controller 100-2 may calculate the emission ratio ER based on deterioration curves of the first light-emitting element ED1 and the second light-emitting element ED2 and may calculate and output first and second gamma values DATA1-2 and DATA2-2 based on the second correction ratio ER', which is obtained by applying the decrease constant to the emission ratio ER. In the first mode, the display device DD may emit light from the first light-emitting element ED1 and the second light-emitting element ED2 in consideration of a deterioration speed. The phenomenon that the deterioration of the second light-emitting element ED2 is perceived by the user due to a difference in the deterioration speed between the first light-emitting element ED1 and the second light-emitting element ED2 may be prevented. Accordingly, the display device DD with improved display quality and a driving method thereof may be provided.

However, this is an illustrative embodiment, and the driving controller 100-2 in an embodiment of the disclosure may include both the user mode selection unit 103 (refer to FIG. 12) and the decrease constant application unit 104. In this case, the decrease constant application unit 104 may also apply the decrease constant to the first correction ratio CR applied after the user mode selection unit 103 (refer to FIG. 12).

Although an embodiment of the disclosure has been described for illustrative purposes, those skilled in the art will appreciate that various modifications, and substitutions are possible, without departing from the scope and spirit of the disclosure as disclosed in the accompanying claims. Accordingly, the technical scope of the disclosure is not limited to the detailed description of this specification, but should be defined by the claims.

As described above, a driving controller may calculate an emission ratio based on deterioration curves of a first light-emitting element and a second light-emitting element, and may calculate and output gamma values based on the emission ratio. In a first mode, a display device may emit light from the first light-emitting element and the second light-emitting element in consideration of a deterioration speed. The phenomenon that the deterioration of the second light-emitting element is perceived by a user due to a difference in the deterioration speed between the first light-emitting element and the second light-emitting element may be prevented. Accordingly, the display device with improved display quality and a driving method thereof may be provided.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A display device comprising:

a display layer including:

a pixel driving circuit;

a first light-emitting element electrically connected to the pixel driving circuit; and a second light-emitting element electrically connected to the pixel driving circuit; and an optical path control layer disposed on the display layer and configured to control a path of light provided from the display layer; and a driving controller configured to drive the display layer, wherein the optical path control layer overlaps the second light-emitting element and controls a path of light provided from the second light-emitting element, and comprises a plurality of sub-optical path control layers OSLs and OSLsu that are sequentially stacked in a direction away from the second light-emitting element, wherein an uppermost sub-optical path control layer OSLsu among the plurality of sub-optical path control layers OSLs and OSLsu includes a plurality of separating walls SWa and an overcoating layer OCLa covering the separating walls SWa, and wherein each remaining sub-optical path control layers OSLs includes the plurality of separating walls SWa and a transmitting layer TRPa covering the plurality of separating walls SWa, wherein the plurality of separating walls SWa include a light-absorbing material or a light-blocking material, wherein each of the plurality of separating walls SW extends in a first direction DR1, and wherein a height SW-HT of each of the plurality of separating walls SWa is twice or more than a width T-WT of a transmission portion TRP between two adjacent separating walls SW SWa among the plurality of separating walls SWa;

wherein, in a plan view, the first light-emitting element does not overlap the plurality of separating walls SWa and the second light-emitting element overlaps the plurality of separating walls SWa;

wherein the first light-emitting element and the second light-emitting element emit light of substantially the same color;

wherein, in the plan view, an area size of an emission area of the first light-emitting element is larger than an area size of an emission area of the second light-emitting element;

wherein the display layer operates in a first mode or in a second mode different from the first mode such that, in the first mode, the first light-emitting element and the second light-emitting element are turned on, and, in the second mode, the first light-emitting element is turned off and the second light-emitting element is turned on; and wherein the driving controller is configured to:

calculate an emission ratio based on a first graph, which is obtained by calculating a first emission efficiency according to a luminance-specific time of the first light-emitting element, and a second graph obtained by calculating a second emission efficiency according to a luminance-specific time of the second light-emitting element; and calculate a first gamma value and a second gamma value, which are respectively applied to the first light-emitting element and the second light-emitting element, based on the emission ratio.

2. The display device of claim 1, wherein the display device further includes a memory, and wherein the first graph and the second graph are stored in the memory.

3. The display device of claim 1, wherein in a plan view, an area size of an emission area of the first light-emitting element is larger than an area size of an emission area of the second light-emitting element.

4. The display device of claim 1, wherein the first gamma value is different from the second gamma value.

5. The display device of claim 1, wherein the display layer operates in a first mode or in a second mode different from the first mode, wherein the first light-emitting element and the second light-emitting element emit light in the first mode, and wherein only the second light-emitting element emits light in the second mode.

6. The display device of claim 5, wherein, in the first mode, first luminance of the first light-emitting element is different from second luminance of the second light-emitting element, and wherein third luminance of the second light-emitting element in the second mode is different from the second luminance of the second light-emitting element in the first mode.

7. An electronic device comprising:

a display layer including:

a pixel driving circuit;

a first light-emitting element electrically connected to the pixel driving circuit; and a second light-emitting element electrically connected to the pixel driving circuit;

an optical path control layer disposed on the display layer and configured to control a path of light provided from the display layer; and a driving controller configured to drive the display layer, wherein the optical path control layer overlaps the second light-emitting element and is configured to control a path of light provided from the second light-emitting element, and wherein the driving controller is configured to:

calculate an emission ratio based on a first graph, which is obtained by calculating a first emission efficiency according to a luminance-specific time of the first light-emitting element, and a second graph obtained by calculating a second emission efficiency according to a luminance-specific time of the second light-emitting element, by retrieving the first graph and the second graph from a lookup table LUT stored in a memory, by extracting a plurality of graphs G1 in which a deterioration amount of the first light-emitting element is similar to a deterioration amount of the second light-emitting element, the plurality of graphs G1 being graphs in which a plurality of first graphs GP1*a*, GP1*b*, GP1*c*, and GP1*d* are adjacent to a plurality of second graphs GP2*a*, GP2*b*, GP2*c*, and GP2*d* at a predetermined time, by selecting the first graph and the second graph, which have a highest emission efficiency, from among the plurality of graphs G1, by selecting a group with a greatest sum of pieces of luminances of the first graph and the second graph from among the plurality of graphs G1, and by setting the emission ratio to be a luminance ratio between the selected first graph and the selected second graph; and calculate a first gamma value and a second gamma value, which are respectively applied to the first light-emitting element and the second light-emitting element, based on the emission ratio, wherein the display layer operates in one of a first mode and a second mode different from the first mode, wherein only the second light-emitting element emits light in the second mode, and wherein, in the second mode, the second viewing angle is 35 degrees, and a luminance at 35 degrees is 0.75 percent of a maximum luminance as controlled by the optical path control layer disposed to overlap the second light-emitting element.

8. The electronic device of claim 7, wherein the display device further includes a memory, and wherein the first graph and the second graph are stored in the memory.

9. The electronic device of claim 7, wherein in a plan view, an area size of an emission area of the first light-emitting element is larger than an area size of an emission area of the second light-emitting element.

10. The electronic device of claim 7, wherein the first gamma value is different from the second gamma value.

11. The electronic device of claim 7, wherein the display layer operates in a first mode or in a second mode different from the first mode, wherein the first light-emitting element and the second light-emitting element emit light in the first mode, and wherein only the second light-emitting element emits light in the second mode.

12. The electronic device of claim 11, wherein, in the first mode, first luminance of the first light-emitting element is different from second luminance of the second light-emitting element, and wherein third luminance of the second light-emitting element in the second mode is different from the second luminance of the second light-emitting element in the first mode.

* * * * *